United States Patent
Ito et al.

(10) Patent No.: US 10,116,860 B2
(45) Date of Patent: Oct. 30, 2018

(54) IMAGING OPERATION GUIDANCE DEVICE AND IMAGING OPERATION GUIDANCE METHOD

(71) Applicant: OLYMPUS CORPORATION, Hachioji-shi, Tokyo (JP)

(72) Inventors: Kensei Ito, Sagamihara (JP); Takato Aoki, Hino (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 22 days.

(21) Appl. No.: 15/261,223

(22) Filed: Sep. 9, 2016

(65) Prior Publication Data

US 2017/0078565 A1    Mar. 16, 2017

(30) Foreign Application Priority Data

Sep. 14, 2015 (JP) ................................ 2015-180571

(51) Int. Cl.
  *H04N 5/232*    (2006.01)

(52) U.S. Cl.
  CPC ..... *H04N 5/23222* (2013.01); *H04N 5/23229* (2013.01); *H04N 5/23293* (2013.01)

(58) Field of Classification Search
  CPC ........... H04N 5/23222; H04N 5/23229; H04N 5/23293; H04N 5/232; H04N 5/23212; H04N 5/2353; H04N 7/181; G11B 27/30; G11B 27/34; G06K 9/00362; G06K 9/00771; G06K 9/00718; G06T 7/246; G06T 2207/10016; G06T 2207/30201
  USPC .................................................... 348/333.02
  See application file for complete search history.

(56) References Cited

U.S. PATENT DOCUMENTS

| | | | | |
|---|---|---|---|---|
| 7,349,020 | B2 * | 3/2008 | Stavely ................. | H04N 5/232 348/239 |
| 9,270,901 | B2 * | 2/2016 | Iki ...................... | H04N 5/23293 |
| 9,479,693 | B2 * | 10/2016 | Kang ................. | H04N 5/23222 |
| 9,497,384 | B2 * | 11/2016 | Panek-Rickerson ........................ H04N 5/23293 |
| 9,635,249 | B2 * | 4/2017 | Kimura ............. | H04N 5/23206 |
| 9,774,780 | B1 * | 9/2017 | Baldwin ............ | H04N 5/23219 |
| 9,848,121 | B2 * | 12/2017 | Perez-Feliciano .......................... H04N 5/23222 |
| 9,875,406 | B2 * | 1/2018 | Haddick ............. | G02B 27/017 |
| 2005/0007468 | A1 * | 1/2005 | Stavely ............. | H04N 5/23222 348/239 |

(Continued)

FOREIGN PATENT DOCUMENTS

| JP | 2007-074057 A | 3/2007 |
|---|---|---|
| JP | 2011-248091 | 12/2011 |

OTHER PUBLICATIONS

Canon PowerShot SX60 HS. Retrieved from https://www.usa.canon.com/internet/portal/us/home/products/details/cameras/ point-and-shoot/long-zoom-cameras/powershot-sx60-hs.

*Primary Examiner* — Pritham Prabhakher
(74) *Attorney, Agent, or Firm* — Volpe and Koenig, P.C.

(57) ABSTRACT

An imaging operation guidance device, comprises an imaging sensor that obtains images of an object and outputs image data relating to the object, a memory that stores the image data and an operation history for the image sensor, and a controller that determines guidance for a current image being obtained, based on difference between at least one previous image and the current image, in accordance with the operation history that has been stored in the memory.

18 Claims, 19 Drawing Sheets

(56) References Cited

U.S. PATENT DOCUMENTS

| | | | |
|---|---|---|---|
| 2009/0015702 A1* | 1/2009 | Garcia Alonso | H04N 5/23222 348/333.02 |
| 2010/0149400 A1 | 6/2010 | Sugino | |
| 2013/0293746 A1* | 11/2013 | Iki | H04N 5/23293 348/239 |
| 2015/0016798 A1 | 1/2015 | Fujimatsu | |
| 2015/0146042 A1* | 5/2015 | Panek-Rickerson | H04N 5/23293 348/239 |
| 2016/0105604 A1* | 4/2016 | Perez-Feliciano | H04N 5/23222 348/262 |

\* cited by examiner

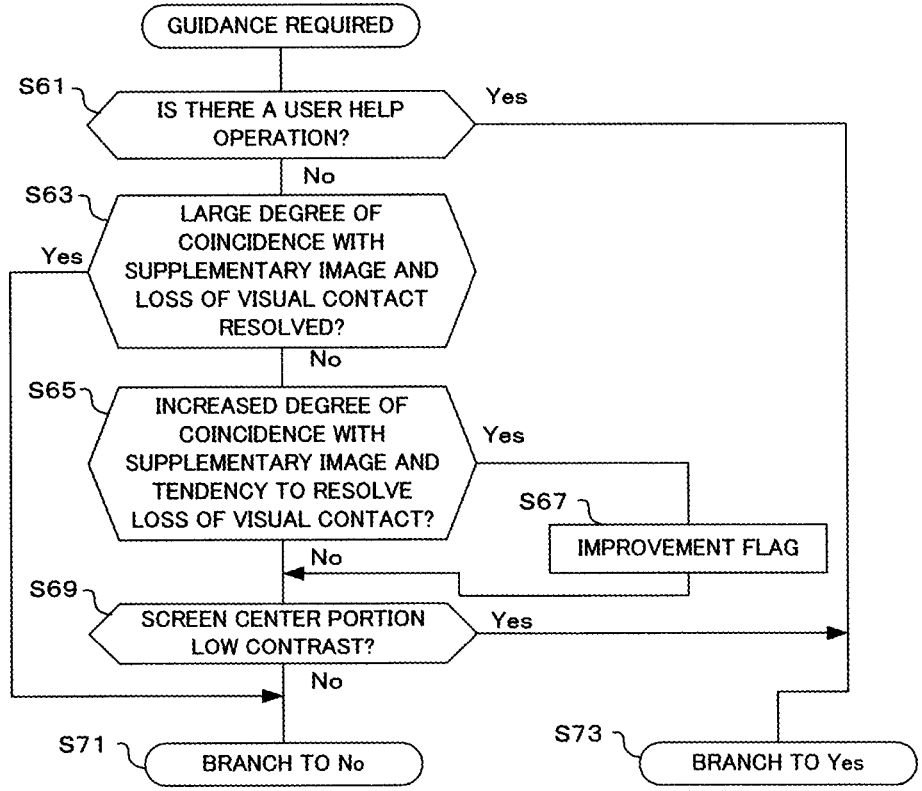
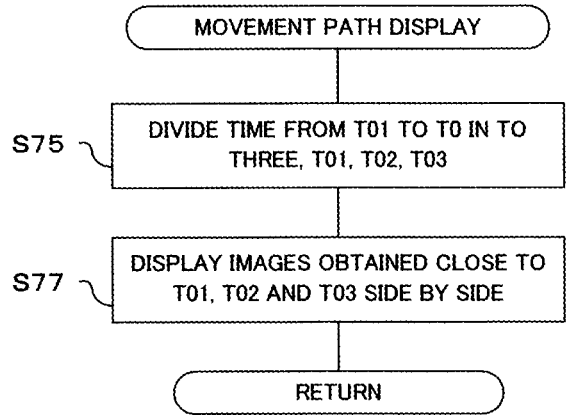

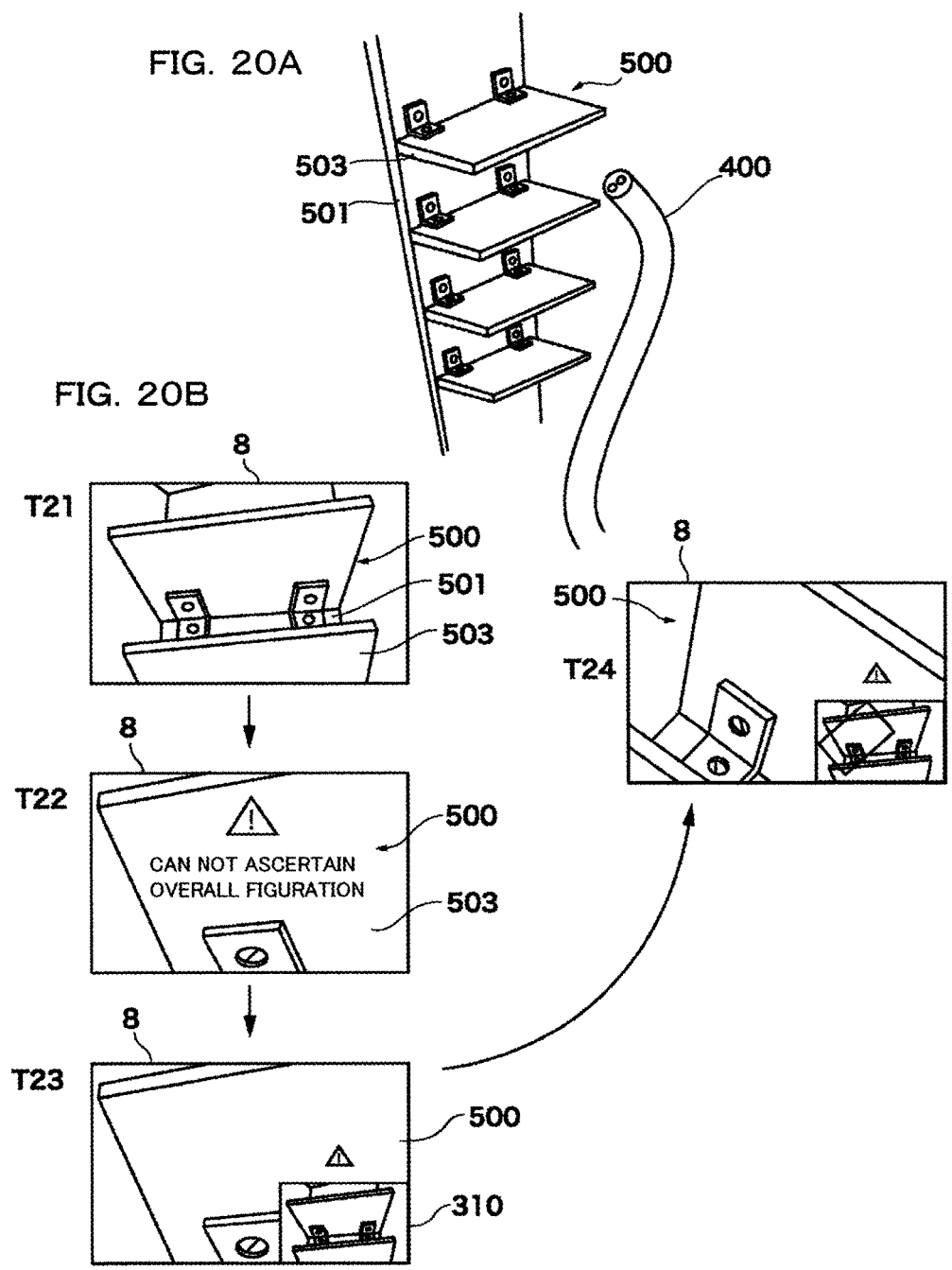

IMAGING OPERATION GUIDANCE DEVICE AND IMAGING OPERATION GUIDANCE METHOD

Benefit is claimed, under 35 U.S.C. § 119, to the filing date of prior Japanese Patent Application No. 2015-180571 filed on Sep. 14, 2015. This application is expressly incorporated herein by reference. The scope of the present invention is not limited to any requirements of the specific embodiments described in the application.

BACKGROUND OF THE INVENTION

1. Field of the Invention

The present invention relates to an imaging operation guidance device and imaging operation guidance method that are capable of simply locating a physical object at the time of imaging with an imaging device, even when the physical object is difficult to find.

2. Description of the Related Art

When taking a picture using an imaging device, shooting is often carried out while watching a monitor screen. At this time visual contact with a photographed physical object may be lost, or it may be difficult to see, due to the limitations of the screen.

An imaging device has been proposed that is capable of finding a photographed physical object, even in a case where a photographed physical object is lost, as has been mentioned above. For example, an imaging device that is capable, when displaying at a first angle of view, of display at a second angle of view that is wider than the first view, is disclosed in Japanese patent laid open number 2007-74057 (hereafter referred to as "patent publication 1").

With the imaging device disclosed in patent publication 1 above, when a photographed physical object is lost, an imaging section with a wide angle of view is required in order to find this photographed physical object. The device is therefore made larger in size and more complicated, and also, salvage methods (procedures for relocating the physical object) are limited and a burden is forced upon the user.

SUMMARY OF THE INVENTION

An object of the present invention is to provide an imaging operation guidance device and an operation guidance method for an imaging device, for finding a physical object when a photographed physical object or monitored physical object has become lost, that is easy for an operator to understand with a simple structure.

An imaging operation guidance device of a first aspect of the present invention comprises an image sensor that images a physical object and outputs image data, a memory that stores an operation history for the image sensor, and a controller for determining guidance relating to discrepancies between a previous image and a current image, in accordance with the operation history that has been stored in the memory.

An imaging operation guidance method of a second aspect of the present invention comprises imaging a physical object and outputting image data, storing an operation history for the imaging, and deciding on guidance relating to discrepancies between the previous image and the current image, in accordance with a previous image that has been acquired and the operation history that has been stored.

An imaging operation guidance device of a third aspect of the present invention comprises an image sensor that images a physical object and outputs image data, an image data memory that stores the image data as a supplementary image, an instruction section that instructs guidance display in order to find the physical object, and a guidance display that displays a supplementary image that was stored in the image data memory before visual contact with a physical object was lost, when guidance display has been instructed by the instruction section.

An imaging operation guidance method of a fourth aspect of the present invention comprises imaging a physical object and outputting image data, storing the image data as a supplementary image, instructing guidance display in order to find the physical object, and displaying, on a display, a supplementary image that was stored before a physical object became lost, when guidance display has been instructed.

BRIEF DESCRIPTION OF THE DRAWINGS

FIG. 7 is a flowchart showing "guidance required" operation of the camera of one embodiment of the present invention.

FIG. 8 is a flowchart showing "imaging section movement path display" operation of the camera of one embodiment of the present invention.

FIG. 20A and FIG. 20B are drawings showing usage examples when the present invention is applied to an endoscope.

DETAILED DESCRIPTION OF THE PREFERRED EMBODIMENTS

Figure 1:
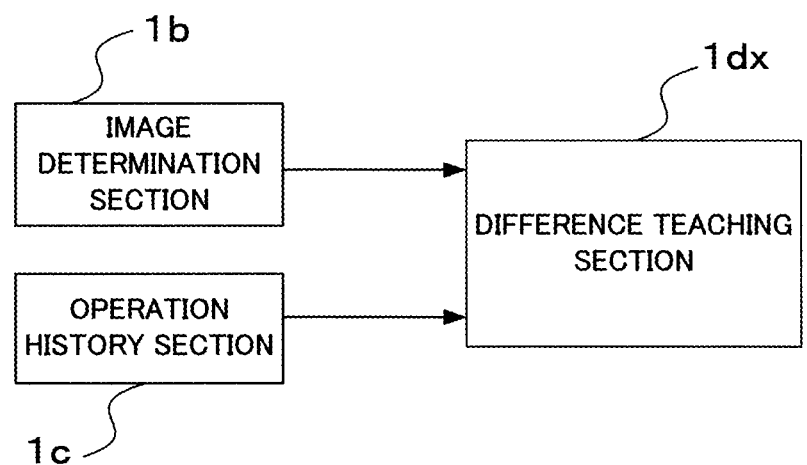
FIG. 1 is a block diagram showing the basic structure of a camera of one embodiment of the present invention.

An embodiment of the present invention will be described in the following using the drawings. FIG. 1 is a block diagram showing the basic structure of this embodiment. An image determination section 1b is input with image data, and determines whether or not visual contact with a physical object has been lost when the user is observing or storing an image.

An operation history section 1c stores a history of operations of a device, such as an imaging device, being used by the user. As the operation history there are, for example, in the case of an imaging device, distance information of a photographing lens, angle of view information (focal length information), optical axis direction of the photographing lens (vertical direction, lateral direction), depth direction, exposure information (screen brightness information), etc. It should be noted that the depth information normally coincides with the distance information, but when the user moves along a wall surface there may be cases where depth of sections within the same screen varies, even when distance of the wall surface imaged on a part of the screen remains constant.

A difference teaching section 1dx is input with a determination result from the image determination section 1b and with a stored operation history from the operation history section 1c, and in the event that an image has changed considerably teaches a difference between a previously acquired image and the current image. Whether or not visual contact with a physical object has been lost is determined based on whether or not an image has changed significantly. Besides this method, determination may be performed using a characteristic of change over time of an image and characteristics of the image itself, and may also take into consideration operation at the time of change (change in position, change in orientation, change in angle of view and change in focus etc.), as well as conditions and the environment. That is, in cases where observation is difficult or there is degradation in visibility due to observation operations corresponding to change in conditions of the physical object, inconsistencies in shooting position, shooting direction and shooting parameter setting (shooting operation) corresponding to change in state of a physical object image that includes its position and movement, or inconsistencies in conditions of the physical object corresponding to observation or imaging operations, it is determined that visual contact with a target section has been lost, and this embodiment elicits effects as will be described later. Specifically, in cases where there is significant change in an image, it is made possible to recapture a physical object that has become lost by displaying operations etc. at the time that there was change. For example, if there is significant change in an image due to the fact that the imaging device was directed largely to the right, that fact may be displayed and moving in the left direction may be taught. Further, previous images may be stored, and operation states and previous images may be displayed. Specific teaching examples will be described later using FIG. 4, FIG. 14, FIG. 15A, FIG. 15B etc.

Figure 2:
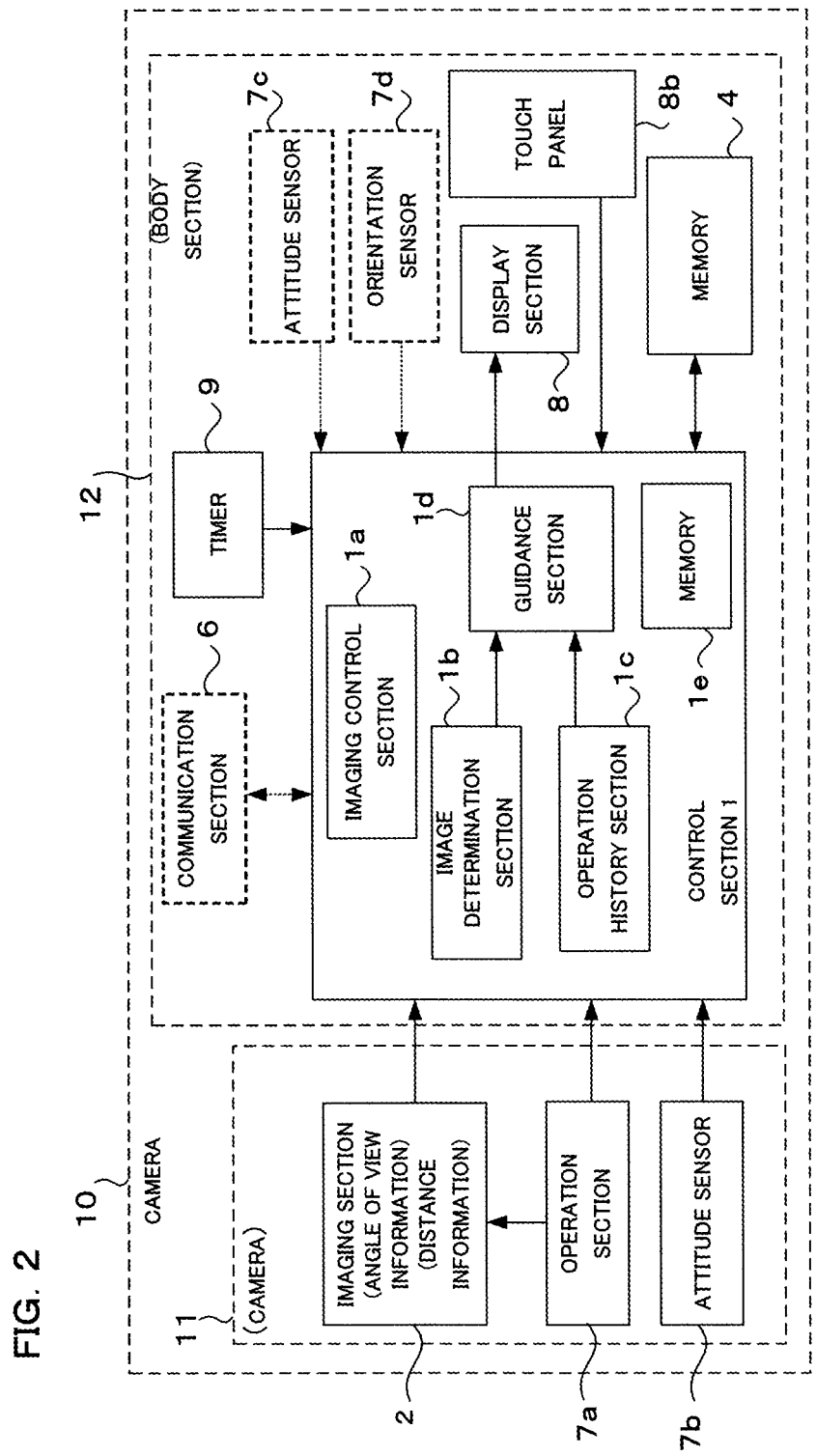
FIG. 2 is a block diagram showing a specific structure of the camera of one embodiment of the present invention.

Next, a specific structure of this embodiment will be described using FIG. 2. This embodiment is an example of the present invention applied to an imaging device 10. This imaging device 10 is made up of a camera section 11 and a body section 12. It should be noted that the camera section 11 and the body section 12 may be integrally formed or may be formed separately. Also, the body section 12 may be an information terminal such as a mobile telephone or a smart phone that performs these functions. The camera section 11 and the body section 12 may be directly connected by means of connection points, or may be connected by means of wireless communication. An imaging section includes basic functions such as a function for taking pictures, a function for observing, and a function for measuring, as well as applied functions.

Within the camera section 11 there are an imaging section 2, operation section 7a and attitude sensor 7b. The imaging section 2 has an optical lens and an image sensor, and subjects a physical object to photoelectric conversion and outputs image data to the body section 12. Also, the optical lens 11 may be constituted by a zoom lens, so as to change angle of view. In a case where a zoom lens is fitted, angle of view information is detected and output to the body section 12. There may also be a so-called autofocus function, and in this case distance to a physical object is detected and distance information is output to the body section 12. The imaging section 2 (image sensor) functions as an imaging section that forms an image of the physical object and outputs image data.

The operation section 7a has operation members of the camera section 11, for example, an angle of view change member (focal length change member), a release button etc., and operation information indicating operating state of the operation section 7a is output to the body section 12. The attitude sensor 7b has a sensor that is capable of detecting orientation state of the camera section 11, such as an angular acceleration sensor, acceleration sensor, Gyro etc., and outputs detection results from this sensor to the body section 12. Using detection output of the attitude sensor 7b it is possible to detect in which of the up, down, left, or right direction the optical axis direction of the optical lens of the imaging section 2 is directed.

A control section 1, memory 4, display section 8, touch panel 8b, timer 9 etc. are provided within the body section 12. An imaging control section 1a, image determination section 1b, operation history section 1c and guidance section 1d are provided within the control section 1. The control section 1 has a CPU (Central Processing Unit) and peripheral circuits for the CPU, and can carry out control of each section within the body section 12 and within the camera section 11 in accordance with programs that have been stored in a memory 1e. The imaging control section 1a, image determination section 1b, operation history section 1c, and guidance section 1d may be constructed as hardware, and may be implemented in the form of software using programs.

The imaging control section 1a carries out exposure control for image data acquired by the imaging section 2, and carries out storage control of image data in response to operation of a shooting instruction member such as the release button of the operation section 7a. The image determination section 1b, similarly to the image determination section 1b shown in FIG. 1, is input with image data from the imaging section 2 etc., and determines whether or not visual contact with a physical object has been lost when the user is observing or storing an image. Whether or not visual contact with a physical object has been lost is determined based on whether or not an image has changed significantly.

The operation history section 1c, similarly to the operation history section 1c shown in FIG. 1, stores an operation history of when the user uses the imaging device 10. As the operation history there are, for example, distance information of an optical lens, angle of view information (focal length information), optical axis direction of the photographing lens (vertical direction, lateral direction), depth direction, exposure information (screen brightness information), etc.

The guidance section 1d corresponds to the difference teaching section 1dx in FIG. 1, receiving output of the image determination section 1b and the operation history section 1c to determine that the user has lost visual contact with a physical object depending on whether or not an image has changed significantly, and when an image has changed significantly information for carrying out guidance so as to be able to relocate the physical object is generated and output to the display section 8.

The guidance section 1d functions as a guidance section (controller) that determines guidance relating to differences between a previous image and a current image, in accordance with images that have been acquired previously by the imaging section and an operation history that has been stored in the operation history section. This guidance section determines guidance based on operation items that were dominant at the time visual contact with an image was lost. Also, the guidance section creates image files in which at least one of symbols representing previous images and operations (for example, the arrow 330a in FIG. 15B) and text (for example 209 in FIGS. 4 and 330B in FIG. 15B) are stored, as guidance relating to differences between previous images and a current image.

Also, when instructing guidance display using the instruction section, the guidance section 1d functions as a guidance display section that displays a supplementary image that has been previously stored in the image data memory as a result of visual contact being lost with the physical object. The guidance display section displays both a current image and the supplementary image side by side (refer, for example, to time T3 in FIG. 4, and FIG. 15A, FIG. 16 and FIG. 18).

The memory 1e includes electrically rewritable non-volatile memory and volatile memory, and performs temporary storage of programs for executing control using the CPU, and image data that has been output from the imaging section 2, and carries out temporary storage of data for execution of the programs. This memory 1e functions as an operation history section (memory) for storing an operation history for the imaging section. Also, the operation history section has at least one of operation information for changing angle of view of the imaging section, operation information for changing lateral and vertical direction of the imaging section, information for changing brightness of the imaging section and information for changing focus of the imaging section (referred to S15 in FIG. 5, which will be described later). The memory 1e also functions as an image data memory for storing image data as a supplementary image.

As well as the above-described functions, the control section 1 also executes various functions as an imaging device 10. For example, image processing is applied to image data that has been input from the imaging section 2, and when carrying out live view display or when a release operation has been performed, image processing for storage is applied to the image data, and storage of the image data in the memory 4 is carried out.

The memory 4 has an electricity rewritable nonvolatile memory that is either fixed into, or detachable from, the body section 12, and carries out storage of image data from the imaging section 2.

The display section (display) 8 has a liquid crystal monitor or organic EL monitor etc., and carries out live view display based on image data from the imaging section 2, playback display based on image data that has been stored in the memory 4, etc. Also, a touch panel 8b is provided on the front surface of the monitor of the display section 8, and detects operating states of touch operations etc. by the user, and outputs to the control section 1. A timer 9 outputs time and date information to the control section 1.

Besides each of the sections described above, the body section 12 is provided with a communication section 6, attitude sensor 7c, orientation sensor 7d, etc., as required. The communication section 6 communicates with external devices in a wired or wireless manner. There may also be communication with an external server or connection to the Internet or the like, by means of the communication section 6.

The attitude sensor 7c, similarly to the attitude sensor 7b within the camera section 11, has a sensor that is capable of detecting attitude state of the body section 12, such as an angular acceleration sensor, acceleration sensor, or Gyro, and detection output from this sensor is output to the control section 1. The orientation sensor 7d includes an electronic compass or the like, with which of North, South, East or West the body section 12 is facing being detected and output to the control section 1. Tilting up and down, and panning to the left or right are examples of operations of the imaging section or framing that are carried out by the user at the time of shooting. By detecting which direction the body section 12 is facing in using the orientation sensor 7d, it becomes possible to acquire information that is more than simply left or right for movement of the body section 12, and output to the control section 1.

Figure 3:
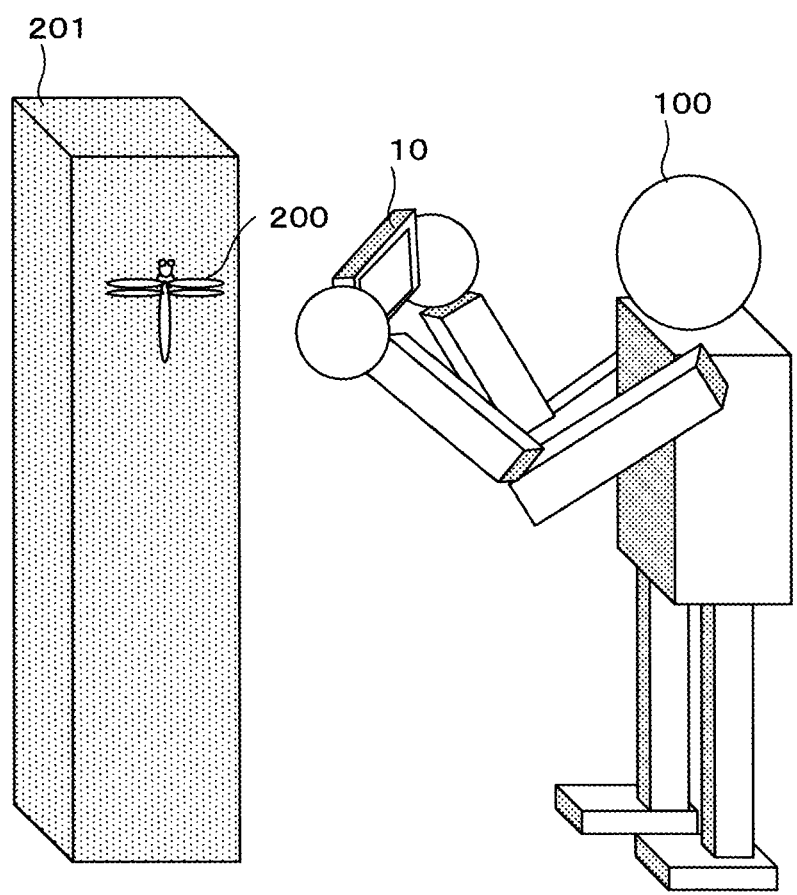
FIG. 3 is a drawing showing usage states of the camera of one embodiment of the present invention.

Next, an overview of the operation of this embodiment will be described using FIG. 3 and FIG. 4. FIG. 3 shows appearance when the user 100 is shooting a physical object 200 that has stopped on a post 201, by aiming the imaging device 10.

Figure 4:
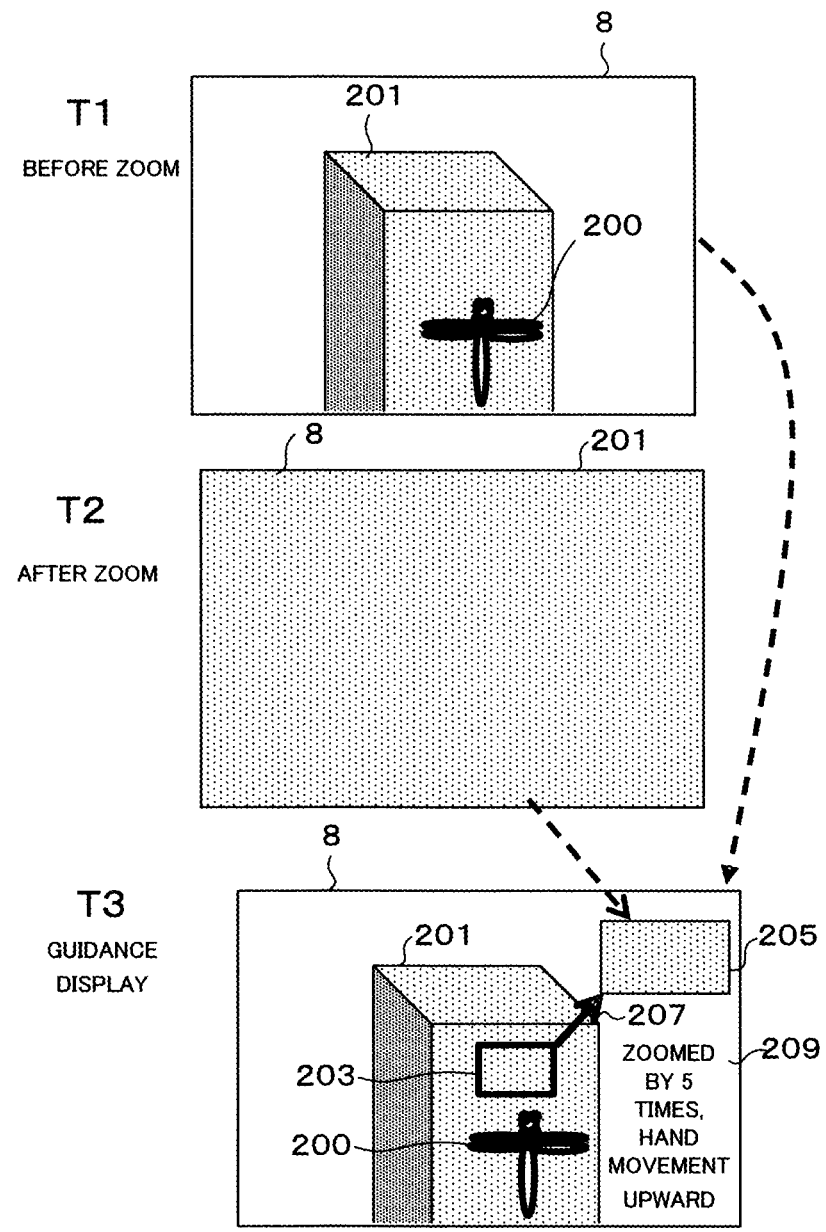
FIG. 4 is a drawing showing display states, in the camera of one embodiment of the present invention

When taking a photograph, the user can confirm the physical object 200 within the display section 8, as shown at time T1 in FIG. 4, by setting the focal length of the optical lens of the imaging section 2 to the wide-angle side. From this state, if the user carries out a zooming operation intending to make the image of the physical object 200 appear larger, and the focal length is changed to the telephoto side, then visual contact with the physical object 200 will be lost, as shown by the image for time T2 in FIG. 4 (here a "time" has been described, but something may occur at any time).

If the image changes significantly like this, this change is detected by the image determination section 1b and the guidance section 1d carries out guidance display on the display section 8, as shown at time T3 in FIG. 4. With the example shown in FIG. 4, a range displayed on the display section 8 at time T2 is shown by a frame 203, and an image that was being displayed at time T2 is shown as a current image 205 on an upper right margin section. Also, positional change between a frame 203 of a previous supplementary image and the current image 205 is shown by an arrow 207. In this way, a movement path of the imaging section when it is difficult to locate the physical object or visual contact has been lost is understood. It should be noted that the way of displaying the arrow 207 may be from the center of the image towards the center etc., and as long as movement path of the imaging section is understood is not limited to the display of time T3 in FIG. 4.

Also, operations at the time that visual contact with a physical object 200 is lost, or the object becomes difficult to find, are shown as the guidance display 209 on the margin section of the display section 8. With this example the guidance display is in the form of the text "zoomed by a factor of 5, hand movement upwards". Using this display the user will understand that visual contact with the physical object has been lost as a result of carrying out zooming of the optical lens and inadvertently pointing the optical lens upwards as a result of hand movement. If the reason for visual contact with the physical object being lost is understood, the user will be able to find the physical object again.

It should be noted that details of the processing for guidance display at the time of a zoom operation such as shown in FIG. 4 will be given later in S33 Yes to S43 in FIG. 6.

Next, operation of this embodiment will be described using the flowcharts shown in FIG. 5 to FIG. 10. These flowcharts are executed by the CPU within the control section 1 controlling each section within the imaging device 10 in accordance with programs that have been stored in the memory 1e (the same also applies to the flowchart shown in FIG. 17 and FIG. 19 which will be described later).

Figure 5:
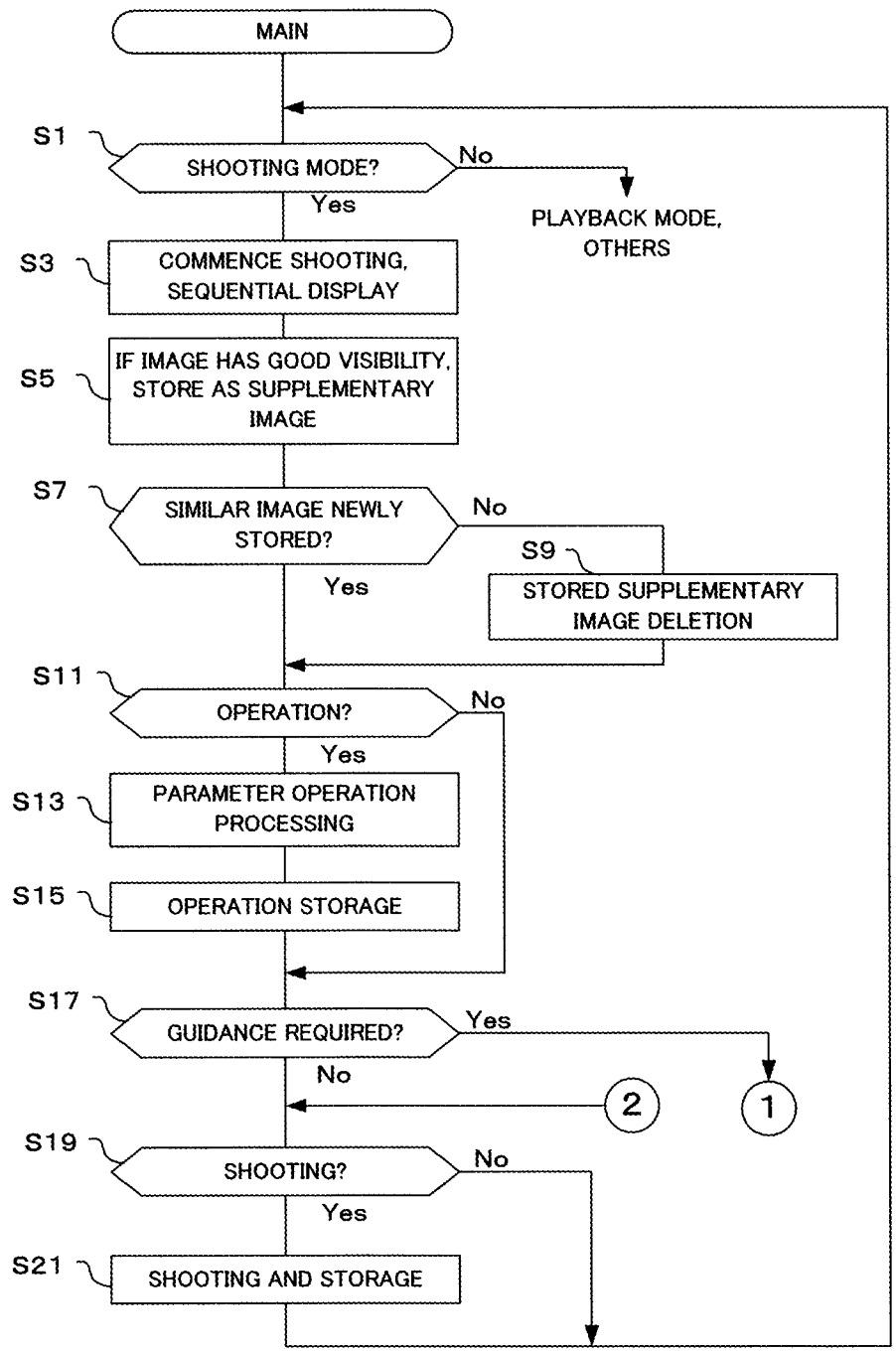
FIG. 5 is a flowchart showing main operation of the camera of one embodiment of the present invention.

If the main flow shown in FIG. 5 is started, it is first determined whether or not the camera is in shooting mode (S1). This imaging device 10 has shooting mode set as the default mode and in the event that another mode, such as playback mode, is not set, in this step shooting mode is determined. If the result of determination in step S1 is not shooting mode, it is determined whether or not another mode, such as playback mode, is set, and processing is performed in accordance with the mode that has been set.

If the result of determination in step S1 is shooting mode, imaging is commenced and sequential display is carried out (S3). Here, the imaging section 2 commences imaging, and image data is output to the control section 1. The control section 1 applies image processing for live view display to the image data, and live view display is carried out on the display section 8. Image data is updated at a given frame rate, and images are sequentially displayed.

Next, if an image has good visibility it is stored as a supplementary image (S5). As will be described later, with this embodiment, in the event that the user no longer knows a position that is being viewed by the imaging device 10, in other words in the event that it is difficult to see a physical object or visual contact has been lost, an image that was being seen up to that point is displayed, in order to assist in searching for the physical object. In order to achieve this display, in step S5 if an image has good visibility it is stored in the memory 1e. It goes without saying that if an image is not required, it may be stored in a temporary separate memory. At a time when shooting has finally been carried out etc., time-lapse images or reference images may be stored together within that taken image file, and by employing a method such as associative storage it is possible to reference the shooting process afterward, and the user can be assisted in various circumstances. Time information etc. that has been output from the timer 9 is also stored together with the taken image file.

Also, the determination as to whether or not visibility is good in step S5 is determined based on whether contrast distribution and histogram distribution of a physical object are appropriate for image recognition, such as mechanical or artificial "facial recognition", and whether saturation, focus, and edges etc. are at appropriate positions etc. Advanced image recognition may be exploited, for faces etc., such as whether or not a characteristic part, for example, apart having eyes, which is important, is contained, or for other cases, whether or not the entire outline of a butterfly wing is contained etc. Whether or not characteristics of an initially acquired image remain, etc., may also be useful. Methods for acquiring characteristic information from images are widely known, and determination may be based on identifying images for each section that has been divided using these characteristics, and whether or not there are sections where characteristics remain within a screen.

Next it is determined whether or not a similar image has been newly stored (S7). In step S5 storage was carried out if an image had good visibility, but if similar images are continuously stored memory capacity will rapidly become fully utilized. Therefore, if there is a similar image, in order to delete this similar image, in step S5 it is determined whether or not a supplementary image that has been stored is similar to a previous image.

If the result of determination in step S7 is that a similar image has been newly stored, the supplementary image that is stored is deleted (S9). As was described previously, in the event the images are similar, the similar images are deleted to make economic use of memory capacity.

If a supplementary image has been deleted in step S9, or if the result of determination in step S7 was that a similar image has not been newly stored, it is determined whether or not an operation has been performed (S11). Here, it is determined whether or not an operation member of the operation section 7a, such as, for example, a zoom operation member, manual focus section (ring member), aperture operation member, shutter speed operation member etc. has been operated. It is also determined whether or not there has been movement by greater than a given amount using the attitude sensor 7b of the optical system, and attitude sensor 7c and orientation sensor 7d of the body operation section.

Also, in step S11 it is determined whether or not focus has changed by greater than a given amount as a result of autofocus (AF). This given amount is dependent on field of view and angle of view information at the time of shooting, and it is effective to use a method to determine the amount, for example, that converts to an angle corresponding to angle of view. If the attitude sensors 7b and 7c are constituted by a Gyro and acceleration sensor, it is possible to convert to an angle using time integration from angular acceleration and acceleration, and it is also possible to convert orientation to an angle using a compass direction represented by a circle of 360°.

If the result of determination in step S11 is that an operation has been performed or the like, next parameter operation processing is carried out (S13). If it has been determined in step S11 that the user has performed an operation using the operation section 7, parameter operation processing corresponding to this operation is carried out. For example, in the event that the zoom operation member has been operated, angle of view is changed in accordance with operation direction and operation amount.

Once parameter operation processing has been carried out, next operation storage is carried out (S15). Here, information such as type and operation amount of an operation member that has been operated, movement amount in a case where the camera has moved (including movement direction), and focus change amount (including change direction), and time information for when these operations were performed, are stored in the memory 1e. Movement amount is detected based on signals from the attitude sensors 7b and 7c and the orientation sensor 7d etc. This may be performed by storing that previously described angle information as change over time. Also, besides operation members, exposure values such as aperture value, ISO sensitivity etc., and brightness signal components of image data are also stored in the memory 1e. The stored items of information are used for operation history determination in step S31, which will be described later, and indetermination of step S33, and is also used when performing the determinations in steps S81, S85, S91, S101 and S109 in FIG. 9.

It should be noted that the storage results for step S15 are stored in time order, and results may be temporarily stored, or storage may be performed by associating with image files so that reference is finally possible from the images. It is easy to understand with an example of technology such as a camera with a GPS function, and determination is made possible if shooting position is represented by converting to coordinates as well as physical object position. Relative coordinates may also be calculated, instead of absolute coordinates, from distance, orientation, and position within the screen etc. This calculation may take shooting position as a point of origin if the physical object is moving, or may take the physical object as a point of origin if the physical object is not moving. Movement of the physical object is known even if an image is determined, and determination may also be by using difference between that very movement itself and a surrounding background.

With the example shown in FIG. 4, the structure on which the dragonfly has aligned may be set as the point of origin. In this case, shooting is performed looking downward, and regarding the overlooking angle, a direction of gravitational force may be determined using a three-axis acceleration sensor, the distance from the point of origin is known based on distance data, and lateral direction is understood from an orientation sensor. With this as a base point, movement after this may be stored as change in data such as acceleration and angular acceleration, and data from the orientation sensor. First a positional relationship between the physical object and the imaging section is ascertained to set the point of origin (relative positional relationship of reference), this is stored and made a reference, and if results of monitoring change from this point onwards are stored in time sequence, operation information is stored. Where an image that was at the center of the screen has moved to may be determined by converting from angle of view at the time of image capture. A reference orientation can also be determined from shooting and observation origin, and direction and gravitational acceleration at the time of a reference positional relationship. The origin (timing) for shooting and observation may be determined based on whether a time at which it is intended to stabilize a physical object is greater than a given time. The user generally locates an observation object, and for a given time observes, identifies and recognizes using the imaging apparatus, followed by a transfer to the next operation.

Once operation storage has been carried out in step S15, or if the result of determination in step S11 was that there was no operation, it is next determined whether or not guidance is required (S17). If the user loses sight of the physical object during observation of a live view image on the display section 8, operation is carried out in order to carryout guidance display, such as a help button of the operation section 7a and help icons that are displayed on the display section 8.

In this step S17 it is determined whether or not the above operation has been performed. As well as manual operation by the user, whether or not guidance is required may also be automatically determined in the imaging device 10. Detailed operation of the determination in step S17 will be described later using FIG. 7. The above-described help button and/or help icons etc. function as an instruction section for instructing guidance display for finding the physical object. This instruction section determines whether or not guidance display has been instructed when guidance display has been instructed as a result of a manual operation, or based on image data. If it is determined that guidance display is necessary, then in steps S31 and after, which will be described later, guidance relating to differences between a previous image and the current image is determined in accordance with a previously acquired image and a stored operation history, and when guidance display has been instructed a supplementary image that was stored before visual contact with the physical object was lost is displayed on the display section. Also, when guidance display has been instructed as a result of a manual operation, the instruction section carries out determination based on image data.

If the result of determination in step S17 is that guidance is not required, it is determined whether or not the operation is shooting (S19). In the event that the user has determined that composition is good and there is a good photo opportunity, the release button within the operation section 7a is operated. Determination in this step is based on whether or not the release button has been operated.

If the result of determination in step S19 is that shooting is taking place, shooting and storage are carried out (S21). Here, the imaging section 2 carries out shooting using given shooting parameters, and outputs image data to the control section 1 after the exposure time has elapsed. The control section 1 applies image processing for storage to the image data that has been input, and stores the image data to the memory 4.

Returning to step S17, if the result of determination in step S17 is that guidance is required, determination of the operation history is carried out from a newly stored supplementary image (S31). If it determined that guidance is required, then in step S31 and after the guidance section 1d of the control section 1 executes control for guidance display. It should be noted that while guidance display is determined based on the operation history, operations stored in the operation history are combinations of various operations, and so guidance display is carried out based on operation items that were dominant when visual contact with the physical object was lost.

First, in step S31, information of operation steps that have already been stored is referenced, and magnitudes of values that have been converted to angular change, for example, are compared to determine dominant operations when visual contact was lost. Naturally determination is not limited to angular change, and may be carried out by converting to magnitude of change in a relative positional relationship between a subject and the imaging section. If this is used concurrently then accuracy is increased. It is easy to understand with an example of technology such as a camera with a GPS function, and a determination is made possible if shooting position is represented by converting to coordinates as well as physical object position. Relative coordinates may also be calculated, instead of absolute coordinates, from distance, orientation, and position within the screen etc. This calculation may take the imaging section as a point of origin if the physical object is moving, or may take the physical object as a point of origin if the physical object is not moving. Movement of the physical object is known even if an image is determined, and determination may also be by using difference between that very movement itself and a surrounding background.

With the example shown in FIG. 4, the structure on which the dragonfly has aligned may be set as the point of origin. In this case, shooting is performed looking downward, and regarding the overlook angle, a direction of gravitational force may be determined using a three-axis acceleration sensor, the distance from the point of origin is known based on distance data, and left and right are understood from an orientation sensor. With this as a base point, movement after this may be stored as acceleration and angular acceleration, and change in data of the orientation sensor. First a positional relationship between the physical object and the imaging section is ascertained to set the point of origin (relative positional relationship of reference), this is stored and made a reference, and if results of monitoring change from this point onwards are stored in time sequence, since it constitutes operation information, magnitude change of this progress should be referred to. It is also permissible to only refer to cases where change is greater than predetermined values or given values determined from shooting conditions such as angle of view. Where an image that was at the center of the screen has moved to may be determined by converting from angle of view at the time of image capture. A reference orientation can also be determined from shooting and observation origin (time), and direction and gravitational acceleration at the time of a reference positional relationship.

In this way, in step S31 a sequence of supplementary images that were stored in step S5 and an operation history of the operation member etc. that was stored in step S15 are read out, and causes of the physical object being difficult to find or becoming lost are determined. For example, in a case where angle of view of the image was changed or there was magnified display before visual contact with the physical object is lost, it can be estimated that visual contact with the physical object was lost due to a zoom operation or magnification. It should be noted that for an image when it has been determined that guidance is necessary in step S17, determination is carried out as an image in which visual contact with a physical object has been lost.

Once operation history determination has carried out in step S31, it is next determined whether or not magnified display was carried out because of a zoom operation or due to close-up (S33). Here, reasons that guidance became necessary are determined based on the operation history determination in step S31, and it is determined whether or not there has been magnification due to a zoom operation or close-up.

If the result of determination in step S33 is that there has been modification due to a zoom operation or proximity, then guidance display such as was described using FIG. 4 is carried out. First, magnification factor E determination is carried out based on a ratio of focal length and distance (S35). Here, magnification factor E is calculated based on a zoom ratio in the event that a zoom operation has been carried out, and based on a distance ratio when the physical object has been approached.

Next, change in shooting center position is determined (S37). Here it is determined by how much and in which direction there has been changed in the shooting center position, based on detection signals from the attitude sensors 7b and 7c, and the orientation sensor 7d. As has already been described, this can be calculated from change over time in acceleration and angular acceleration with a reference relative positional relationship or a reference orientation as a reference point. Obviously it is possible to use change in orientation and direction of gravitational force directly. Where an image that was at the center of the screen has moved to may be determined by converting from angle of view at the time of image capture.

Next, display of a supplementary image that has been stored is carried out (S39). Here, until the user loses sight of the physical object, the supplementary images that were stored in step S5 are read out from the memory 1e within the control section 1, and displayed side by side so as to be visible. It should be noted that as a display method for the supplementary images, there may be sequential display in time series.

If display of the supplementary images has been carried out, in parallel the current image is displayed at a magnification of 1/E (S41). Since the magnification factor E was calculated in step S35, in this step the image is displayed on the display section 8 at the magnification of 1/E based on current image data from the imaging section 2. Because the current image is magnified, being displayed in a reduced size is easier to see, and since display is carried out in parallel with previously stored supplementary images it becomes easy to understand progress up until it became difficult to find the physical object and visual contact was lost.

Once display of the current image has been carried out, next, where a shooting center has moved to in a stored supplementary image is displayed (S43). Since change in shooting center position has been determined in step S34, in this step display is carried out so as to reflect the change in the shooting center position. For example, as was described using the display for time T in FIG. 4, a movement path is shown by the arrow 207.

If the result of determination in step S33 is that there has been no magnification due to a zoom operation or proximity, stored supplementary images and the current image are displayed side-by-side (S51). Here, a sequence of previous supplementary images up until the user lost sight of the physical object is read out from the memory 1e within the control section 1, a current image is generated based on image data from the imaging section 2, and these images are displayed side by side on the display section 8 (refer to FIG. 15A which will described later). By comparing and looking at supplementary images and the current image, it is possible to gain an understanding of progress up until the user lost sight of the physical object.

Next it is determined whether or not the reason for visual contact with the physical object being lost was due to movement (S53). There may be cases where visual contact with the physical object is lost due to the user swinging the imaging device 10 up and down or to the left and right, and due to the imaging device 10 moving etc. In this step it is determined whether or not losing sight of the physical object is due to movement of the imaging section, based on stored supplementary image and detection signals from the attitude sensors 7b and 7c and the orientation sensor 7d etc.

If the result of determination in step S53 is that losing visual contact was due to movement of the imaging section, a movement path of the imaging section is displayed (S55). Here, supplementary images that were stored in step S5 are read out, and the read-out supplementary images are displayed side-by-side. By looking at the supplementary images, the user can gain an understanding of what type of movement of the imaging device 10 caused loss of visual contact with the physical object, or why the physical object is difficult to find. Detailed operation for display of this movement path will be described later using FIG. 8.

If the movement path has been displayed in step S55, or if the result of determination in step S53 was that loss of visual contact was not due to movement of the imaging section, guidance display is performed for imaging control appropriate to resolving the loss of visual contact (S57). Here, guidance display is carried out in accordance with the reason for the physical object being difficult to find or the reason for loss of visual contact, so that the user can re-locate and observe the physical object they had lost sight of. Detailed operation of the guidance display for this imaging control will be described later using FIG. 9 and FIG. 10.

If movement display has been carried out in step S43 or if guidance display for imaging control has been carried out in step S57, then in the event that the determination of whether or not shooting is in progress in previously described step S19 is that shooting is in progress, shooting and storage are carried out in step S21.

If shooting and storage have been carried out in step S21, or if the result of determination in step S19 was that shooting is not in progress, processing returns to step S1 and the previously described operation is carried out.

In this way, with this embodiment, during a shooting operation images are made into supplementary images and stored (S5), and in a case where guidance is necessary due to the user losing sight of a physical object (S17), guidance display is carried out (S43, S57) in accordance with the reason for visual contact being lost (S33). Also, in carrying out the guidance display, by carrying out display of a current image and supplementary images (S39, S41, S51) it is possible to intuitively gain an understanding of the situation up until visual contact was lost. Display is also carried out that makes it easy to understand change in shooting center position (S43).

Next, detailed operation of the determination as to whether or not guidance is required in step S17 (refer to FIG. 5) will be described using FIG. 7. If the flow for requiring guidance is entered, it is first determined whether or not there is a user help operation (S61). If the user loses sight of the physical object during observation of a live view image on the display section 8, operation is carried out in order to carry out guidance display, such as a help button of the operation section 7a and help icons that are displayed on the display section 8. In this step, it is determined whether or not this operation has been performed.

If the result of determination in step S61 is that there has been no help operation by the user, and it is determined whether or not a degree of coincidence with a supplementary image has become large and loss of visual contact has been resolved (S63). There may be cases where the physical object has been found again even if the user has briefly lost visual contact with the physical object. In this step, this determination is based on whether or not a degree of coincidence between a supplementary image that was stored before visual contact was lost, and the current image, has become large.

If the result of determination in step S63 is that loss of visual contact has not been resolved or the physical object can not be detected, next it is determined whether or not there is a tendency towards resolving the loss of visual contact based on an increase in the degree of coincidence with the supplementary image (S65). Even if loss of visual contact has not been resolved, in a case where degree of coincidence between the supplementary image and the current image is increased over time there is a tendency for the loss of visual contact to be resolved as a result of a user operation or processing of the imaging device 10. In this step, whether or not loss of contact is being resolved and whether or not there is a tendency to detect the physical object are based on change over time in the degree of coincidence.

If the result of determination in step S65 is that there is a tendency towards the loss of visual contact being resolved, an improvement flag is set (S67). This improvement flag is used at the time of the determination in step S113 of FIG. 10 which will be described later. In the event that there is a tendency towards resolution of the loss of visual contact, the guidance display makes this fact clear.

If the improvement flag has been set in S67, or if the result of determination in step S65 is that there is not a tendency towards resolution of the loss of visual contact or the physical object can hardly be detected, it is determined whether or not a screen sensor portion is low contrast (S69). Generally, a physical object will be at the center part of the screen, and ordinarily this physical object will be in focus. Therefore, in the event that the screen center portion is low contrast the possibility that visual contact with the physical object has been lost is high. It is also possible to use this type of image pattern as information for when determining loss of visual contact.

If the result of determination in step S69 is that the screen center portion is low contrast, or if the result of determination in step S61 is that a user help operation has been performed, it is determined that guidance display is necessary (S73).

On the other hand, if the result of determination in step S69 is that the screen center portion is not low contrast, or if the result of determination in step S63 is that loss of visual contact has been resolved or the object has been found etc., it is determined that guidance display is not necessary (S71).

Once the respective determination results have been decided in steps S71 and S73, the original processing flow is returned to. In this way, in the flow for guidance required, besides causing guidance display to be carried out as a result of a manual operation by the user (refer to S61), it is determined whether or not guidance display is necessary by comparing supplementary images and the current image.

In this way, with this embodiment, without being limited to a case where the user has performed a manual operation of an operation member to determine that guidance is necessary in order to locate a physical object, guidance display is automatically switched to in accordance with extent of change between a supplementary image and a current image, or in accordance with a contrast state of a screen center portion. It should be noted that switching to guidance display may be performed only as a result of a manual operation or only automatically.

Next, detailed operation of the movement path display in step S55 (refer to FIG. 6) will be described using FIG. 8. If the flow for movement path display is entered, first of all time from T01 to T0 is divided into three to give T01, T02 and T03, respectively (S75). Here, T01 corresponds to the oldest time, among the supplementary images stored in step S5. Also, time T0 corresponds to either the time when the user loses sight of the physical object or the time when it is no longer possible to detect a physical object image etc.

Next, images that have been acquired close to T01, T02 and T03 are displayed side-by-side (S77). In step S5, when a supplementary image is stored, time information is also stored. In this step, supplementary images that have stored therein time information close to times T01, T02 and T03 that were calculated in step S61 are read-out, and the read-out supplementary images are displayed side by side on the display section 8. Once display of the supplementary image has been carried out, the flow for movement path display is completed and the originating flow is returned to.

It should be noted that while in FIG. 8 an example of dividing into three times has been described, it is also possible to divide into four or five times as long as the extra complexity can be supported in terms of screen size and layout time. However, if there is not much information guidance will become difficult with fewer hints. In particular, if elapsed time needs to be long there is a possibility that there will be a lot of operations in the interim, and so it would be better to increase guidance. In cases such as when visual contact with a physical object is lost and recovery operations are performed many times in a state of panic, the recovery operations may all be stored and displayed. Also, differences between results of recovery operations carried out hastily, as well as time when visual contact is lost, when the object cannot be found, and time when image detection is not possible, may be summarized and organized into three operations.

For example, in a case where a physical object could not be found by moving the camera 10 up and down, and could not be found by moving to the right, since moving the camera up and down has already been tried and is not important, and moving to the right has also been tried, these types of operation that were unable find the physical object are omitted etc., and guidance that saves time may be issued. Here, priority may be given to guidance to move to the left, which has not yet been tried. In other words, the guidance section 1d determines guidance based on dominant operation items at the time that visual contact with an image was lost, but the "dominant operation items" may preferably include operations from which "items that have already been tried and were not able to resolve loss of visual contact, and items that could not be found etc." have been eliminated. Items that have already been tried and failed can still constitute effective information for preventing futile repetition of such operations. Obviously there are many cases where dominant operation items at the time visual contact of an image was lost, instructed by the guidance section 1d, are mainly operations immediately after losing contact and immediately after image disappearance etc. Therefore, although there is a possibility that the user may be flustered and try other things, in this regard a method where operations up to entering a state immediately after visual contact was lost are suggested first, and after that actions to be taken immediately after losing visual contact are suggested, is effective.

In this way, with this embodiment, in a case where the user has lost sight of a physical object as a result of moving the imaging device 10 up and down or to the left and right etc., since supplementary images that have been stored during a period of time from a state where the physical object was discerned, acquired or detected until visual contact was lost are displayed, it is possible to intuitively gain an understanding of a movement path. It should be noted that with this embodiment although the time from T01 to T0 has been divided into three, the number of divisions is not limiting. The number of divisions may be determined taking into consideration size of the display section and how easy it is for the viewer to see etc. The number of divisions may also be appropriately set by the user using the operation section 7a etc.

Figure 9:
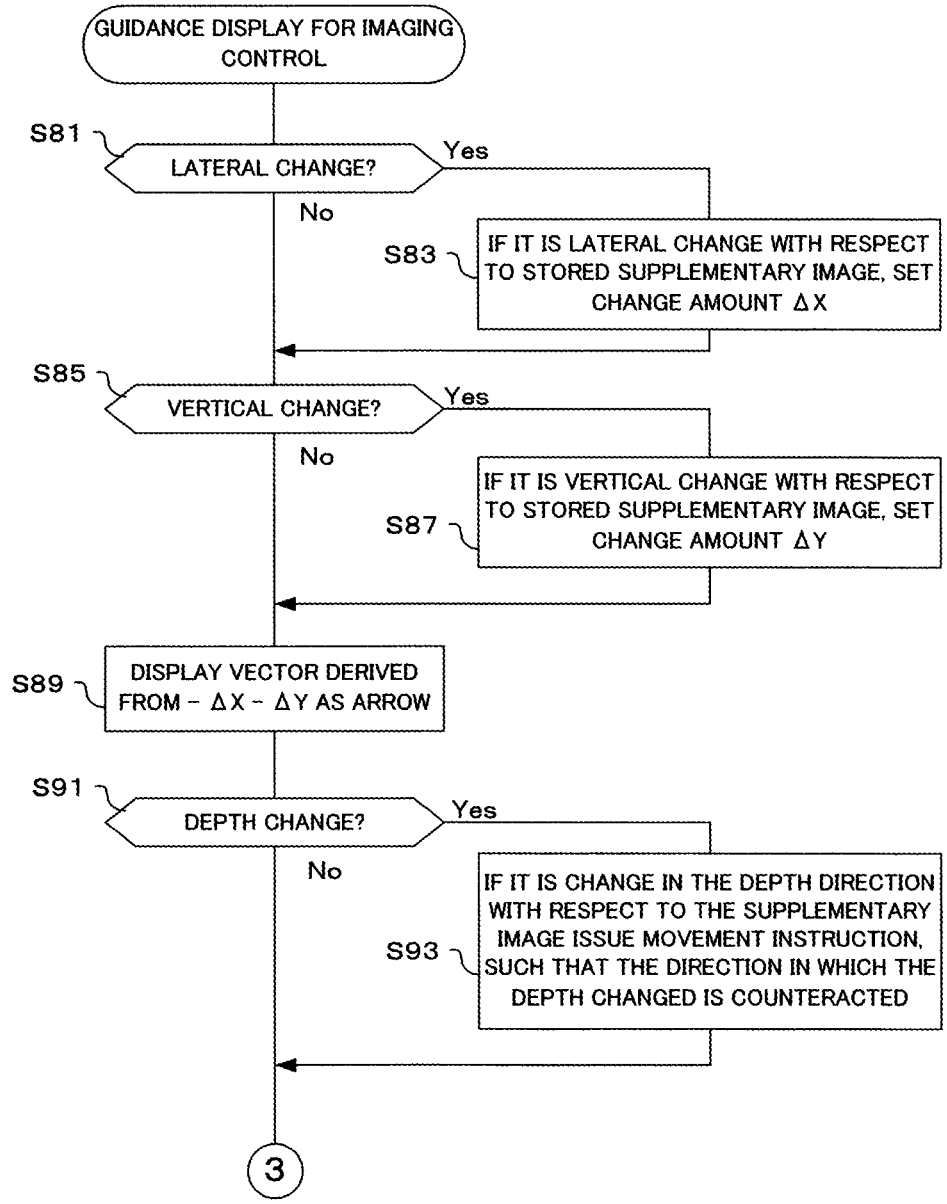
FIG. 9 is a flowchart showing "imaging control guidance display" operation of the camera of one embodiment of the present invention.
Figure 10:
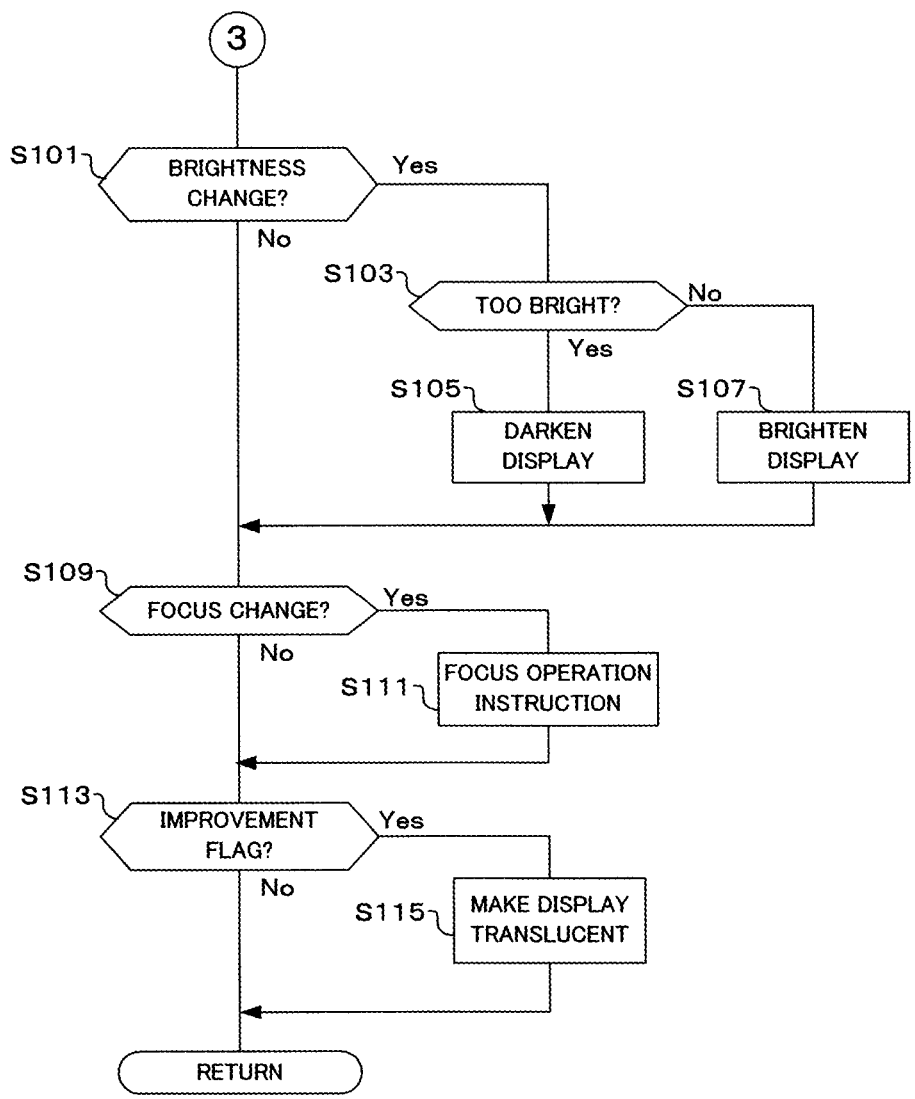
FIG. 10 is a flowchart showing "imaging control guidance display" operation of the camera of one embodiment of the present invention.

Next, detailed operation of the guidance display for imaging control in step S57 (refer to FIG. 6) will be described using FIG. 9 and FIG. 10. If the flow guidance display for imaging control is entered, it is first determined whether or not there is lateral change (S81). Since an image moves laterally if the optical axis of the optical system of the imaging section 2 is moved laterally, it is determined whether or not the imaging device 10 has moved laterally based on variation over time of detection signals from the attitude sensor 7b or the attitude sensor 7c that were stored in step S15. As well as the attitude sensors, determination as to whether or not there has been lateral movement may also be based on image data of supplementary images that have been stored or image data from the imaging section 2.

If the result of determination in step S81 is that there is lateral change, if it is lateral change with respect to the stored supplementary images, change amount $\Delta X$ is set (S83). Here stored supplementary images and a current image are compared, and a lateral change amount $\Delta X$ is calculated. If the attitude sensors 7b and 7c are acceleration sensors, outputs of the acceleration sensors may be subjected to time integration.

Once the change amount $\Delta X$ has been obtained in step S83, or if the result of determination instep S81 is that there is no lateral change, it is next determined if there is vertical change (S85). Since an image moves vertically if the optical axis of the optical system of the imaging section 2 is moved vertically, it is determined whether or not the imaging device 10 has moved vertically based on variation over time of detection signals from the attitude sensor 7b or the attitude sensor 7c that were stored in step S15. As well as the attitude sensors, determination as to whether or not there has been vertical movement may also be based on image data of supplementary images that have been stored or image data from the imaging section 2.

If the result of determination in step S85 is that there is vertical change, if it is vertical change with respect to the stored supplementary images, change amount $\Delta Y$ is set (S87). Here stored supplementary images and a current image are compared, and a vertical change amount $\Delta Y$ is calculated.

Figure 15A:
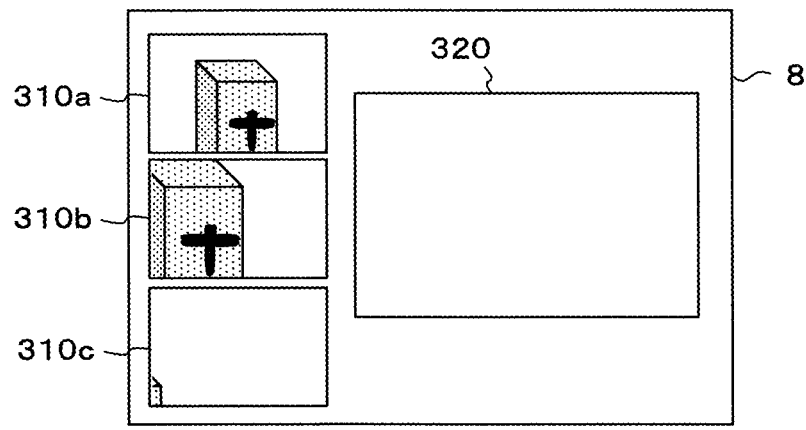
FIG. 15P, and FIG. 15B are drawings showing examples of guidance display, in the camera of one embodiment of the present invention.
Figure 15B:
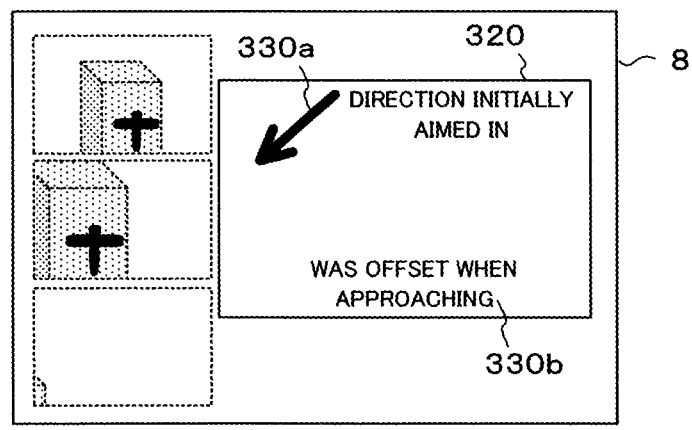

If change amount $\Delta Y$ has been obtained in step S87 or if the result of determination in step S85 is that there is no vertical change, next vectors resulting from $-\Delta X$ and $-\Delta Y$ are displayed using an arrow (S89). Here arrows of the same magnitude (namely $-\Delta X$ and $-\Delta Y$) facing in an opposite direction to a direction in which the imaging device 10 has moved are displayed on the display section 8 based on the change amount $\Delta X$ and change amount $\Delta Y$ that were obtained in steps S83 and S87. In actual fact, in a case where visual contact with the physical object has been lost, there will be a composite movement of lateral and vertical movement. By displaying the arrow as shown in FIG. 15B, the user can reacquire the physical object without moving the optical axis direction of the imaging device 10 to face in both directions.

Once the vector display has been carried out in step S89, it is next determined whether or not the depth has changed (S91). If there is movement along the wall or the like, depth will change, and there are cases where visual contact with the physical object is lost. Here, determination is carried out by comparing depth of stored supplementary images and depth of a current image. This depth means a distance to a physical object, and the closest item etc. may be set as a candidate. If this is too close, a small physical object may often move out of the angle of view, and loss of visual contact arises. Distance may take into consideration distance at which focus is achieved, or a distance sensor may be provided.

If the result of determination in step S91 is that there has been change in depth, if it is change in depth of a stored supplementary image a movement instruction, such that the direction in which the depth changed is counteracted, is issued (S93). Here, an instruction such as instructing movement in an opposite direction to direction of movement immediately before visual contact with an image was lost, for example an arrow, is displayed on the display section 8. For example, in a case of losing visual contact as a result of downward movement, arrow display in an upward direction they be issued to the screen, and "please point upwards" may also be displayed. This type of display information is provided as a table in the memory 1e or the like, and may be referenced in accordance with direction or the like.

If a movement instruction has been issued in step S93, or if the result of determination in step S91 was that there was no change in depth, it is next determined whether or not there has been brightness change (S101). In cases such as where the subject field suddenly becomes bright (or dark), or when an exposure control value such as aperture value has changed significantly, a brightness signal of image data will change significantly and as a result visual contact with the physical object may be lost. For example, if the aperture is suddenly opened up or light is suddenly irradiated, the screen will become completely white and visual contact with the physical object will be lost. Also, conversely, if the aperture is suddenly changed to its smallest aperture value or irradiation of light is suddenly turned off, the screen will become completely black and visual contact with the physical object will be lost.

In this step S101, determination is based on amount of change in a brightness signal component of image data that was stored in step S15. As amount of change in this case, it is only necessary to determine whether there is change to the extent that visual contact with the physical object is lost, and in cases where the scene is too bright or too dark, respectively different change amounts may be set. It should be noted that determination is not limited to change amount, and may be performed by comparing with a given value for a brightness signal component at the time visual contact was lost. In this case determination needs to be performed for both when the scene is too bright and when the scene is too dark.

If the result of determination in step S101 is that brightness has changed, it is next determined whether the scene is too bright (S103). Here it is determined whether or not the reason for change in brightness that was determined in step S101 is due to being too bright.

If the result of determination in step S103 is to bright, there is instruction to make the scene dark (S105). Here an instruction such as to carry out adjustment of aperture value or ISO sensitivity so as to darken the screen from an all white state to such an extent that discrimination of the physical object is possible, is displayed on the display section 8. It should be noted that the imaging control section 1a of the imaging device 10 may also carry out automatic adjustment.

If the determination in step S103 was not too bright, an instruction so as to increase brightness is issued (S107). If the cause of losing visual contact with the physical object is being too dark, instruction such as to adjust aperture value or ISO sensitivity so as to brighten to such an extent that the physical object can be discriminated, is displayed on the display section 8. It should be noted that the imaging control section 1a of the imaging device 10 may also carry out automatic adjustment.

If there has been an instruction to darken in step S105, or if there has been an instruction to brighten in step S107, or if the result of determination in step S101 is that there has been no change in brightness, it is next determined whether or not there has been focus change (S109). Here, in a case where focus has been attempted based on focus information, distance information, current focus information etc. that was stored in step S15, but resulted in being out of focus, it is determined whether or not there has been significant change in the position and distance of that defocus.

If the result of determination in step S109 is that there has been focus change, focus operation instruction is carried out (S111). Here, the fact that focus has been lost and that it is necessary to carry out a focus operation is displayed on the display section 8. It should be noted that an automatic focus adjustment device (AF) within the imaging device 10 may also perform focusing using autofocus. At the time of a manual focus operation, even if it is known whether or not focus has slipped, it is not known whether the focus has slipped towards the telephoto end or the close up end, with respect to physical object distance. Guidance is therefore given regarding toward which of the telephoto end or the close up end focusing should be performed by refocusing and carrying out distance determination again. In the case of operating a special dial or the like, specifically displaying movement direction to be operated would be easier to understand. However, an instruction such as "distance is too close" may be given as guidance, or displayed together, since there is a possibility that the user can resolve the situation with an operation such as stepping back. If it is in a vicinity of limit focusing distance, that is more convenient.

If focus operation display has been carried out in step S111, or if the result of determination in step S109 is that there was no focus change, it is next determined whether or not the improvement flag has been set (S113). In previously described step S67 (refer to FIG. 7), the improvement flag is set in the event that the degree of losing visual contact tends to be canceled. With this embodiment, in the event that the extent to which visual contact is lost is tending to be resolved by user operations, in step S115 guidance display is carried out such that the user will know that the directions of operations currently being performed are beneficial.

If the result of determination in step S113 is that the improvement flag has been set, display is made translucent (S115). Here, for example, the guidance display 209 such as shown in FIG. 4 is displayed in a translucent manner. By displaying in a translucent manner, it will be understood that it will be possible to capture the physical object within the screen of the display section 8 if operations the user is carrying out continue. It should be noted that making items translucent is not limited to the guidance display, and images such as the supplementary images may also be made translucent, and both the guidance display and the supplementary image may be made translucent. It is also possible to detect a degree to which resolution of the extent of loss of visual contact is resolved, and vary the degree of translucency in accordance with the degree of this resolution. It is also possible to have display other than translucent display, such as, for example, highlighted display.

If display has been made translucent in step S115, or if the result of determination in step S113 is that the improvement flag has not been set, the flow for guidance display for imaging control is completed and the originating flow is returned to.

In this way, with this embodiment, the reason the visual contact with the physical object was lost is determined (S81, S85, S91, S101, S109), and guidance display is carried out in accordance with that reason (S89, S93, S105, S107, S111). As a result it is possible for the user to recapture the physical object that they had lost sight of within the screen.

Figure 11:
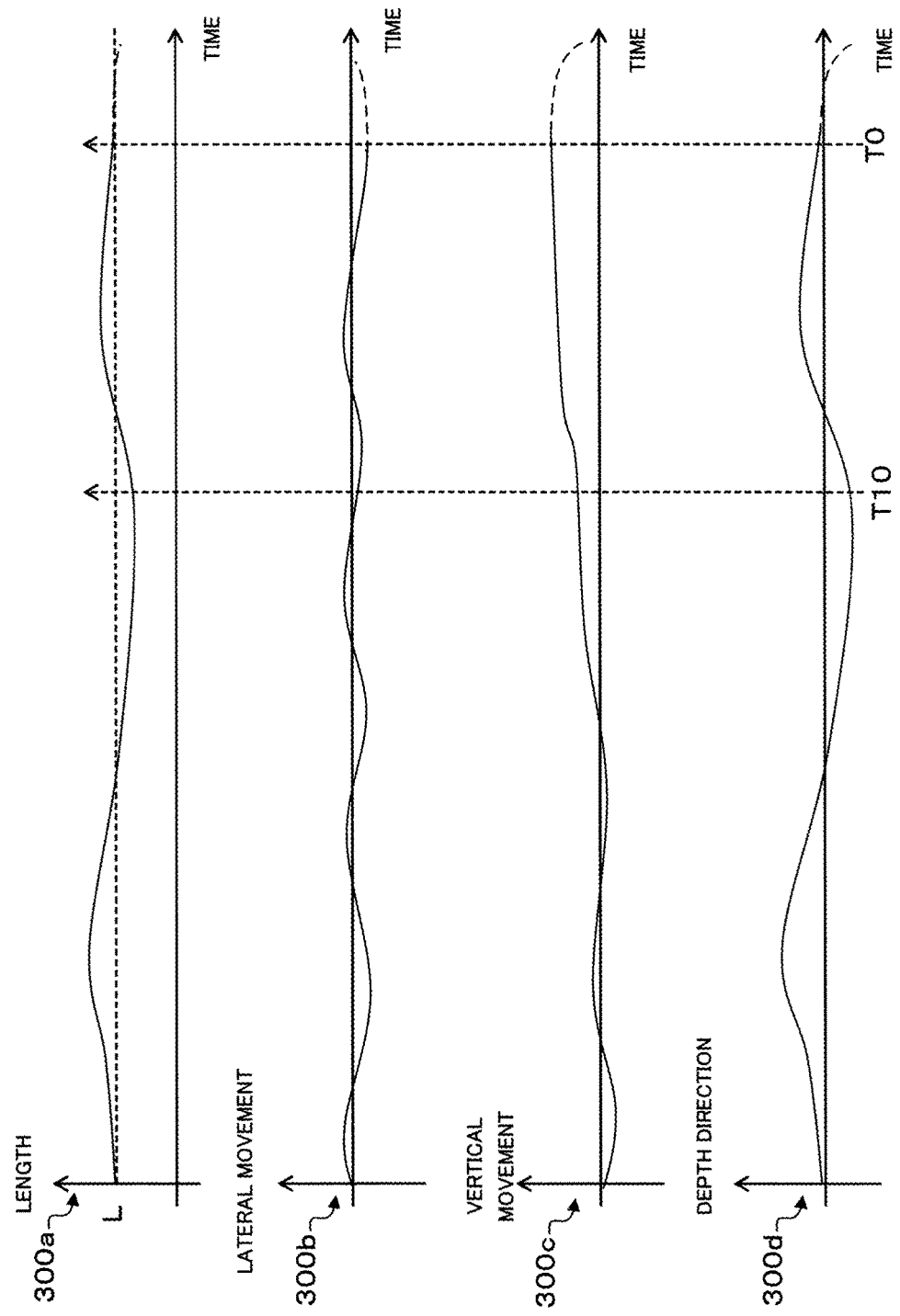
FIG. 11 is a drawing showing operation history, in the camera of one embodiment of the present invention.
Figure 12:
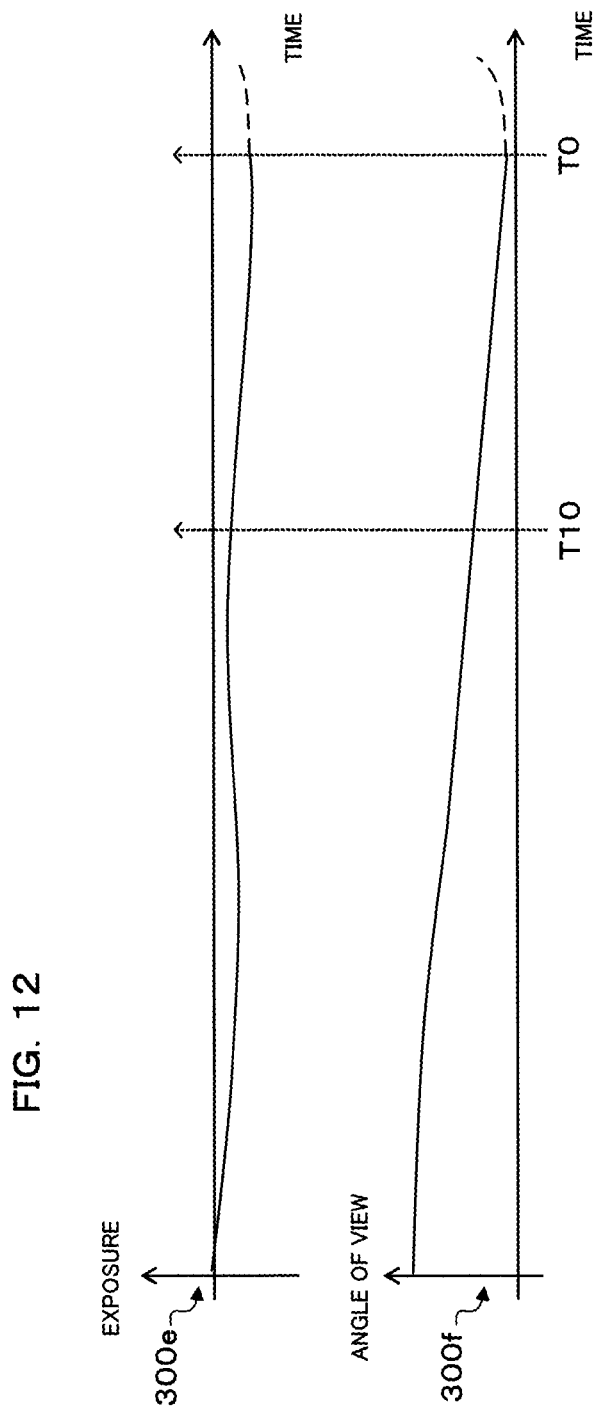
FIG. 12 is a drawing showing operation history, in the camera of one embodiment of the present invention.

Next, one specific example operation of this embodiment will be described using FIG. 11 to FIG. 15B. FIG. 11 and FIG. 12 are one example of operation history stored in step S15. In FIG. 11 and FIG. 12, the horizontal axis represents time, and time T0 is a point at which it has been determined in step S17 that guidance is necessary.

The vertical axis in graph 300a is distance, and shows variation in distance to the physical object over time. It should be noted that the vertical axis may be made focus position of a lens of the imaging section 2. With the example shown in graph 300a, the distance fluctuates with time with respect to L, and it is understood that the user is somewhat unsure about distance.

The vertical axis on graph 300b is position in the lateral direction, and shows change of position in the lateral direction over time. With the example shown in graph 300b position in the lateral direction fluctuates with time, and it will be understood that the imaging device 10 is moving very slightly to the left and right.

The vertical axis on graph 300c is position in the vertical direction, and shows change of position in the vertical direction over time. With the example shown in graph 300c position in the vertical direction fluctuates with time, and it will be understood that the imaging device 10 is moving very slightly up and down, and has skewed slightly upwards at time T10.

The vertical axis in graph 300d shows distance in a depth direction, and shows change in screen depth direction (namely distance to the physical object) over time. Distance in a depth direction coincides with distance to the physical object, but incases such as when advancing along the wall surface, distance in the depth direction changes even if distance is fixed. With the example shown in graph 300d, it will be understood that distance in the depth direction is fluctuating with time.

The vertical axis in graphs 300e represents exposure amount, and represents change in exposure amount over time. Here, exposure amount is equivalent to light amount that is incident on the image sensor surface, and a case where exposure amount is large represents that the scene is becoming bright, while a small exposure amount represents that the scene is becoming dark. If an exposure control value such as aperture value is changed, exposure amount will also change. With the example shown in graph 300e, it will be understood that the background has become slightly dark.

The vertical axis in graphs 300f represents angle of view, and represents change in angle of view over time. Angle of view changes as a result of the user carrying out zooming operations. With the example shown in graph 300f, it will be understood that angle of view is becoming smaller (changing towards a long focus side).

In this way, various operation amounts (distance, lateral and vertical position, distance in the depth direction, exposure amount, angle of view) are changed when the user is using the imaging device 10, and these operation amounts are stored as a history (S15 in FIG. 5). It should be noted that with this embodiment the operation history is not limited to operations that have been manually performed by the user, and is used with a wide meaning, to include history such as position of the imaging device when it is being held and amounts for automatic control by the imaging device etc.

Next, storage of supplementary image will be described using FIG. 13. As was described previously, shooting is commenced and images having good visibility are stored as supplementary images (refer to S5 in FIG. 5), and in the event that similar images are being stored, supplementary images that have been stored are deleted (S7 No→S9 in FIG. 5).

Figure 13:
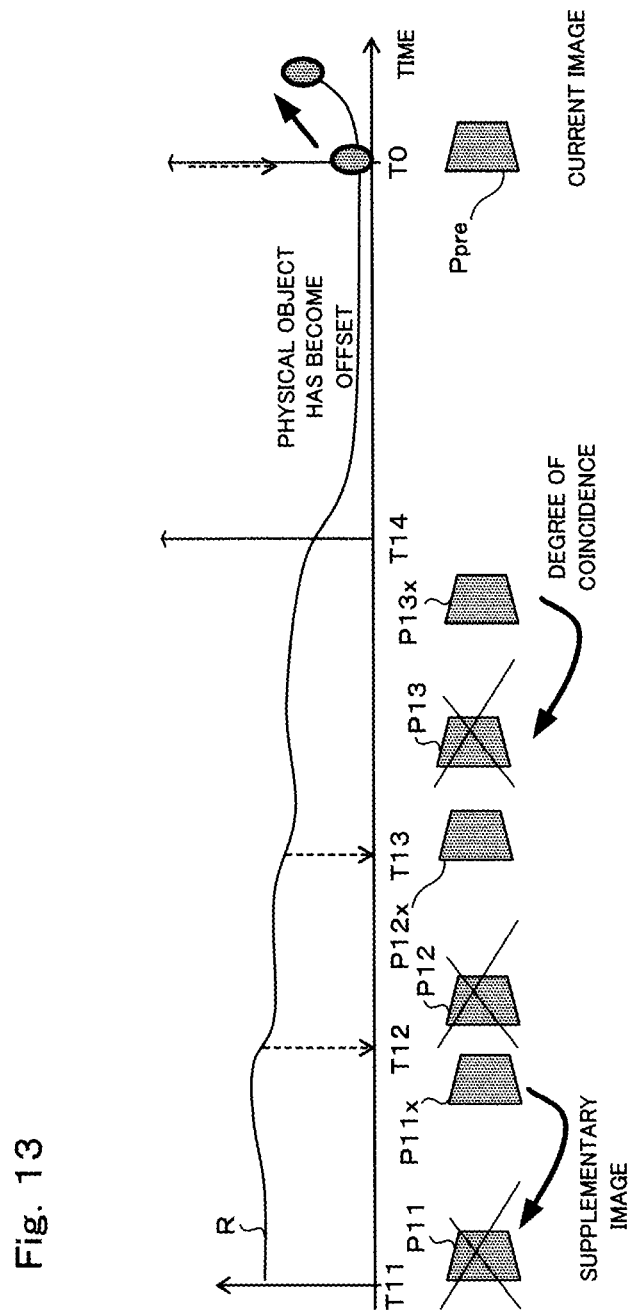
FIG. 13 is a drawing showing image variation when an operation has been changed, in the camera of one embodiment of the present invention.

FIG. 13 shows one example of storage of these supplementary images. The curve R in the graph shown in FIG. 13 represents change over time of operation amount, such as angle of view or position in the vertical and lateral direction. A supplementary image P11 is stored at time T11 but since there are similar images from time T11 until immediately before T12 a supplementary image P11x that was stored immediately before time T12 is stored in the memory 1e and supplementary image P11 is deleted. It should be noted that the term "time" may be replaced with the term "timing".

After the supplementary image P11x has been stored, there are similar images from time T12 until immediately before T13, and therefore the supplementary image P12 is stored once but deleted at the end, and only supplementary image P12x remains as a supplementary image. There are also similar images from time T13 until immediately before T14, and similarly only supplementary image P13x remains. As a result supplementary images P11x, P12x and P13x for immediately before times T12, T13 and T14 are stored in the memory 1e.

Figure 14:
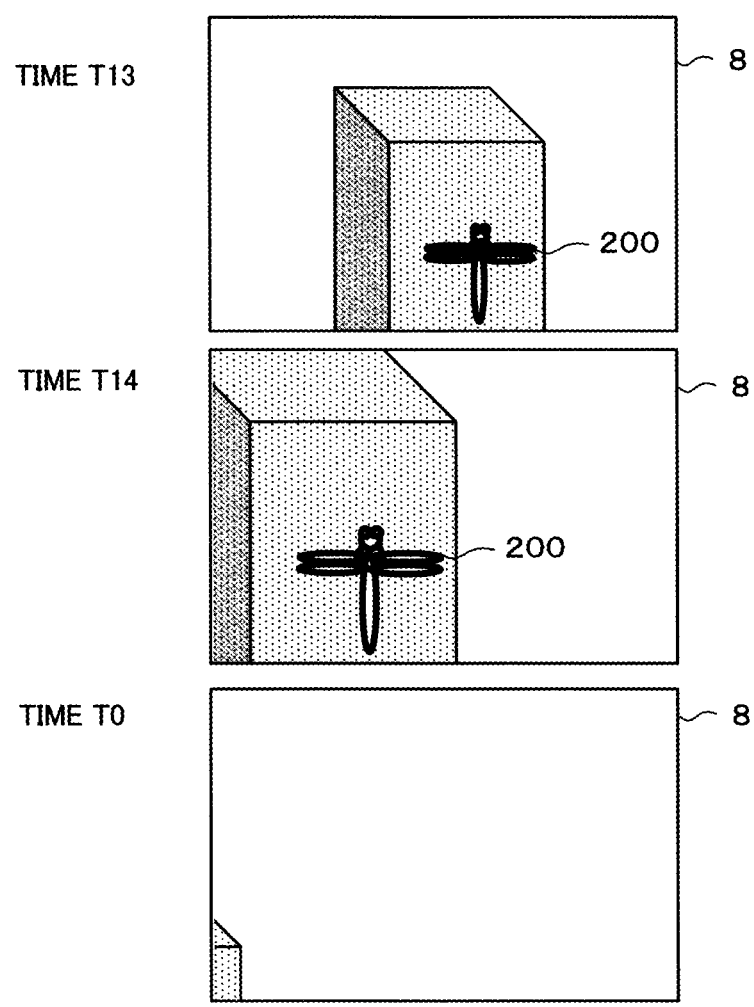
FIG. 14 is a drawing showing change over time of a physical object displayed on a display section, in the camera of one embodiment of the present invention.

Operation amount changes significantly close to time T14, the physical object moves out from within the screen, and the user uses sight of the physical object. The physical object cannot be confirmed with the current image Ppre at time T0, so the user requires guidance display and performs operations in order to carry out guidance display, such as operating a help button or clicking on a help icon. If guidance display is being carried out, the user can recapture the physical object by operating and acting in accordance with the guidance display stop Next, change in an image displayed on the display section 8 and guidance display will be described using FIG. 14, FIG. 15A and FIG. 15B. FIG. 14 shows image change up until visual contact with the physical object is lost. In FIG. 4 an example is shown where angle of view is changed as a result of carrying out zooming, and visual contact with the physical object is lost, but in FIG. 14 an example is shown where visual contact with the physical object is lost as a result of the imaging device 10 moving vertically and laterally.

At time T13 the physical object 200 is within the screen of the display section 8. From this state, at time T14 the optical axis of the lens of the imaging device 10 is moved slightly to the upper right and angle of view is also made smaller (change towards the long focus side). At time T14, as shown by the center image of FIG. 14, the physical object is within the screen, but if the imaging device 10 is moved further and time T0 is reached, the physical object 200 can no longer be seen within the screen of the display section 8 (refer to the lower image of FIG. 14.

If time T0 is reached and the physical object can no longer be seen, guidance display is carried out as a result of the user operating a help button or clicking on a help icon. Guidance display will be described using FIG. 15A, and FIG. 15B.

Figure 6:
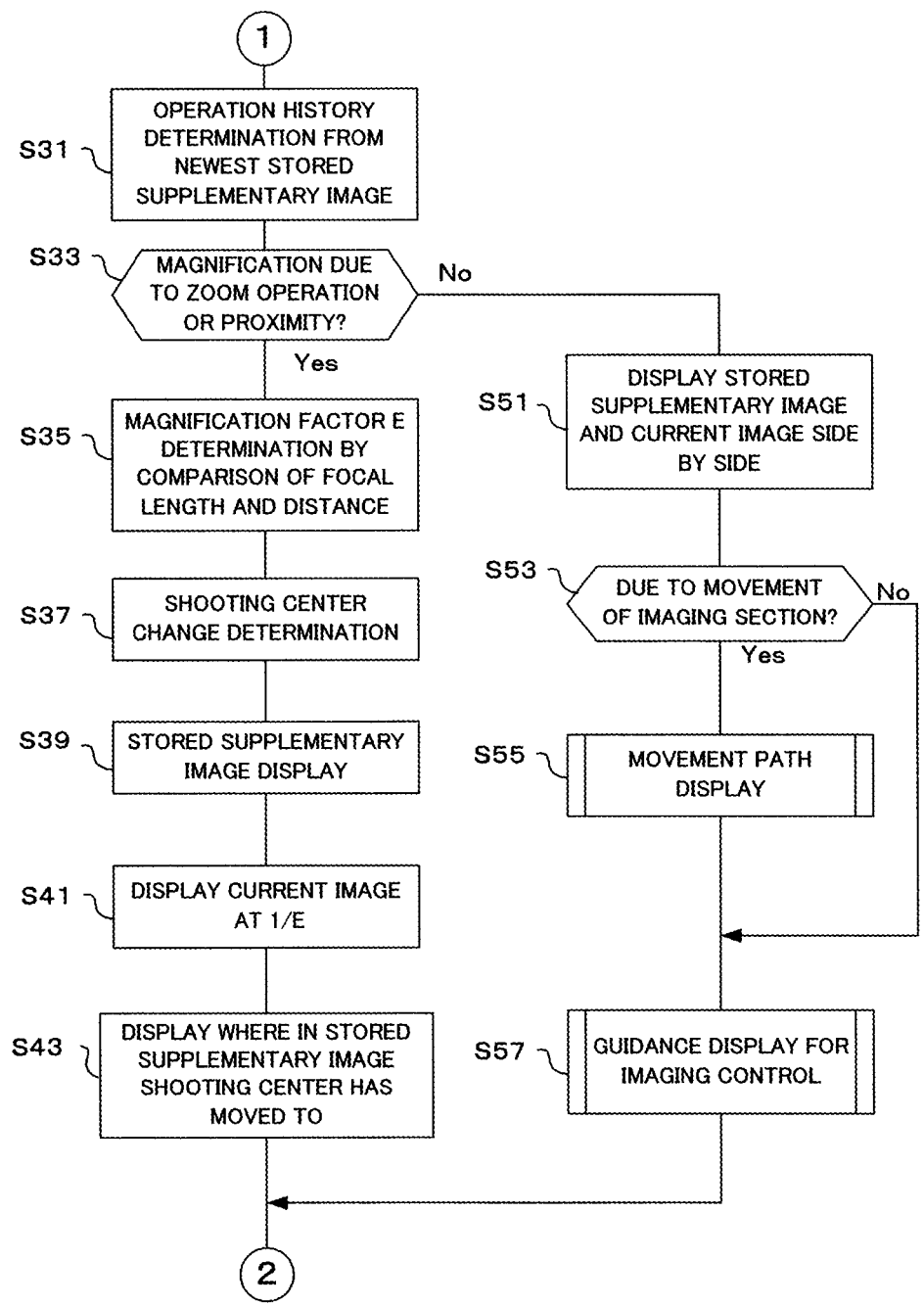
FIG. 6 is a flowchart showing main operation of the camera of one embodiment of the present invention.

If it is determined that guidance display is necessary (S17 Yes in FIG. 5), determination of operation history is performed (S31 in FIG. 6). With the example shown in FIG. 14 since the imaging device 10 being moved is dominant, guidance display is performed in accordance with S51 to S57 in FIG. 6. First, supplementary images 310a to 310c such as shown in FIG. 15A are displayed in a line (refer to S51 in FIG. 6). Specifically, supplementary images 310a to 310c that were stored at times T13, T14 and T0 (refer to FIG. 14) are displayed in a line beside the current image 320. It should be noted that although the supplementary images are displayed in a line on the right side in FIG. 15A, they may also be arranged below the current image, or arranged in a line at another position within the screen.

Next, display is carried out in order to resolve the fact that visual contact has been lost. For example, as shown in FIG. 15B an arrow 330a representing movement direction is displayed, and a message 330b (with this example, "displaced when getting close") is displayed. At this time, the supplementary images 310a to 310c may be displayed as they are, but they may be removed at the point in time when the resolving operation is commenced such that the meaning of the arrow 330a is not misinterpreted.

In this way, with this embodiment, an operation history for the imaging section is stored (S15 in FIG. 5), and in the event that visual contact with a physical object is lost (S17 Yes in FIG. 5) guidance display is carried out (S35 to S43, S55, S57 in FIG. 6) based on the operation history (S31, S33, S53 in FIG. 6) so that the physical object can be recaptured. As a result, when a physical object that is being photographed or a physical object that is being observed is lost, it is possible to find the physical object even if without an imaging section having a wide angle of view.

Next, a first modified example of this embodiment will be described using FIG. 16 and FIG. 17. With one embodiment of the present invention, supplementary images 310a to 310c are simply lined up, as shown in FIG. 15A and FIG. 15B. However, with the first modified example, if a supplementary image is selected, an operation history for when that supplementary image was stored is displayed as text. Since operating state is displayed for each supplementary image, the user can easily implement operations and processes in order to cause redisplay of the physical object.

Figure 16:
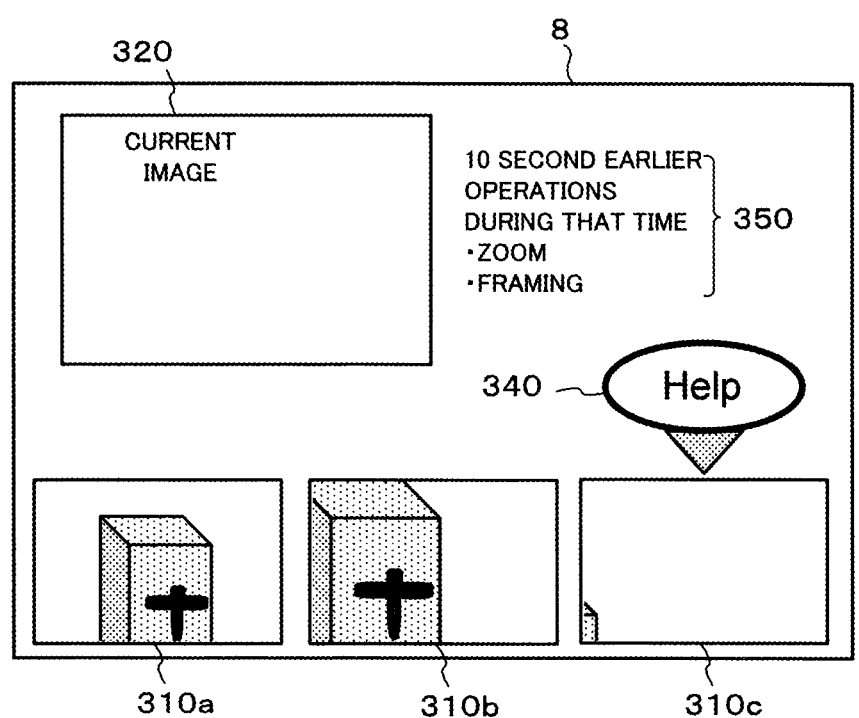
FIG. 16 is a drawing showing a first modified example display of guidance display, in the camera of one embodiment of the present invention.
Figure 17:
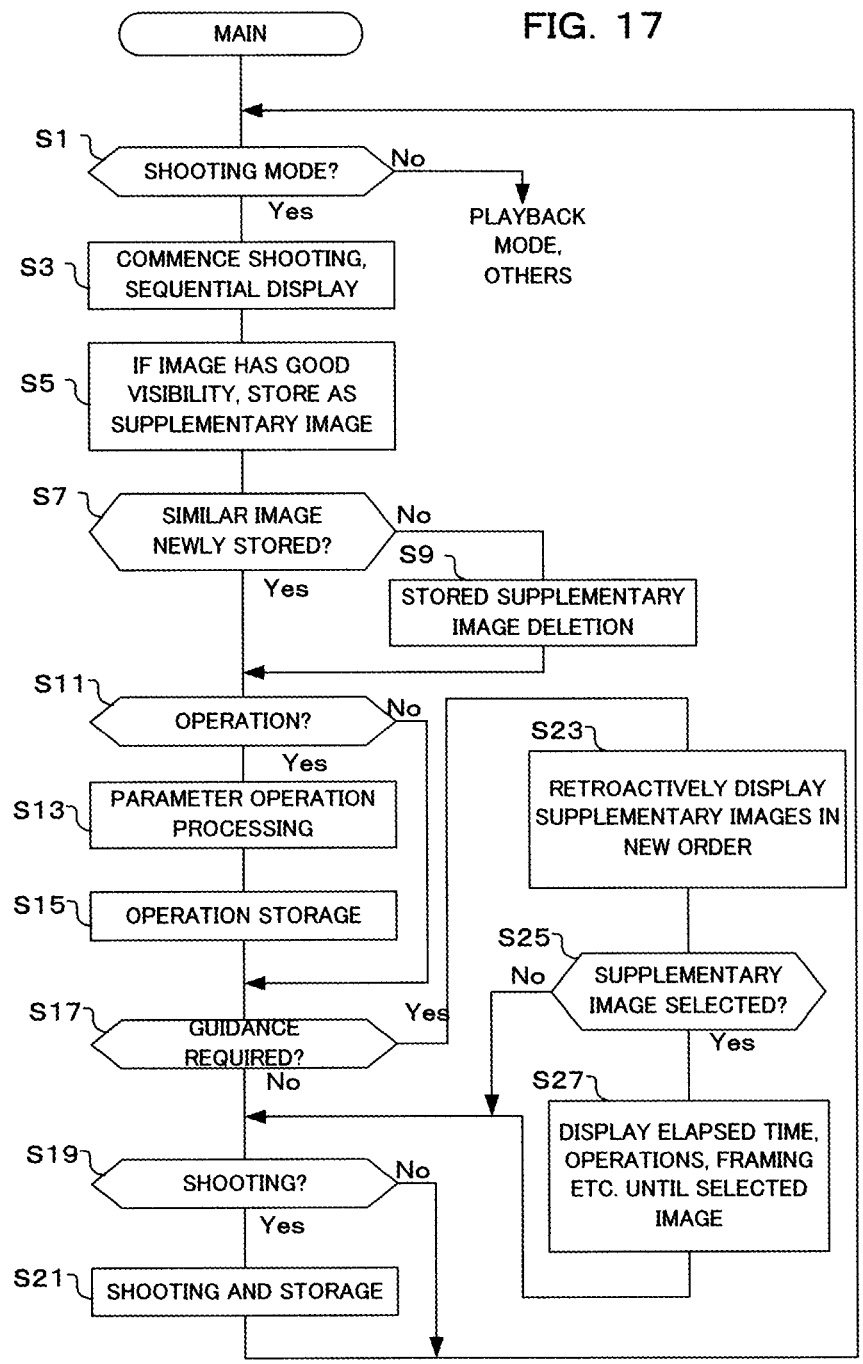
FIG. 17 is a flowchart showing main operation of the first modified example of guidance display, in the camera of one embodiment of the present invention.

FIG. 16 shows display of the display section 8 when it has been determined that guidance display is required, with this modified example. The current image 320 is displayed large on the screen of the display section 8, and supplementary images 310a to 310c are displayed below the current image 320. A help display icon 340 is capable of being moved below the supplementary images 310a to 310c by a user's touch operation, and either of these supplementary images can be selected. It should be noted that besides a touch panel operation the help display icon may be moved by operation of a cross shaped button or the like of the operation section 7a.

If either of the supplementary images 310a to 310c has been selected using the help display icon 340, an operating state at the time or storage of the selected supplementary image is displayed as text in a history display area 350. As this displayed operating state, there are, for example, various items of information such as time until it was determined that guidance display was necessary, a zooming operation, a focusing operation, an exposure control value such as aperture, movement information such as framing etc., based on information that was stored in step S15.

With the example shown in FIG. 16, supplementary image 310c is selected using the help display icon 340, and in this state the fact that the image was stored 10 seconds earlier, and that in the period from ten seconds earlier until it was determined that guidance display was required there was a zoom operation and a framing operation, are concisely displayed on the history display area 350.

The supplementary images 310a and 310b are capturing the physical object, but visual contact with the physical object has been lost in supplementary image 310c, and so by selecting the supplementary image 310c the user can confirm operating states from when visual contact with the physical object was lost up to the current point in time using the display in the history display area 350.

Next, the main operation of this modified example will be described using FIG. 17. Main operation of this modified example is the same as that of the one embodiment, except that the flowcharts of the main operation in FIG. 5 and FIG. 6 are replaced by the flowchart in FIG. 17, and in detail, parts of FIG. 6 are replaced with steps S23 to S27 in FIG. 17. Description will therefore concentrate on this point of difference.

If the flow for main operation of this modified example is started, in step S17 it is determined whether or not guidance is required, and if it is determined that guidance is required supplementary images are retroactively displayed in a new order (S23). Since guidance is necessary, the guidance section 1d carries out control for guidance display in step S23 and onwards. Here, as was shown in FIG. 16, supplementary images 310c, 310b and 310a are displayed on the display section 8. The supplementary images were stored in the memory 1e in step S5, and so these images are read out and retroactively displayed in the new order.

Next it is determined whether or not a supplementary image has been selected (S25). Here it is determined whether either of the supplementary images has been selected using the help display icon 340 or the like. If the result of this determination is that an image has not been selected, processing advances to step S19.

On the other hand, if the result of determination in step S25 is that a supplementary image has been selected, elapsed time, operations, framing etc. up until the selected image is displayed (S27). Here, history display, such as operating states, is carried out on the history display area 350 for the supplementary image that has been selected. History display such as operating states is carried out based on operations stored in step S15. Once display has been carried out, processing advances to step S19.

In this way, with this modified example, if the user loses sight of the physical object on the display section 8 and determines that guidance display is necessary (or if it is automatically determined), display of supplementary images in addition to the current image is carried out. If the user selects a supplementary image, a history of operating states after that supplementary image was stored is displayed. Specifically, if either of the supplementary images that are being displayed on the guidance display section is selected, an operation history from the point in time that the selected supplementary image was stored is displayed. As a result it is possible to easily confirm the progress of operating states after visual contact with the physical object was lost, and it is possible to easily capture the physical object again.

It should be noted that with this modified example display on the history display area 350 has been in the form of text, but text display is not limiting, and other visual display methods may be used such as symbols and pictograms, and audio display may also be used. Also, although three supplementary images have been displayed, two images may be displayed or form or more images may be displayed, and further, arrangement positions of the supplementary images are not limited to being below the current image. Also, although a supplementary image has been selected using a help selection icon, this is not limiting, and another selection method may be used, such as selecting using a direct touch operation or a cross-shaped button.

Next, a second modified example of this embodiment will be described using FIG. 18 and FIG. 19. With the one embodiment and the first modified example of the present invention the user was able to gain an understanding of progress from previously to the present using supplementary images and an operation history. With the second modified example, further, in a case where there is a similar history, operations up to recapture of the physical object in this similar state are displayed as a reference for the user.

Figure 18:
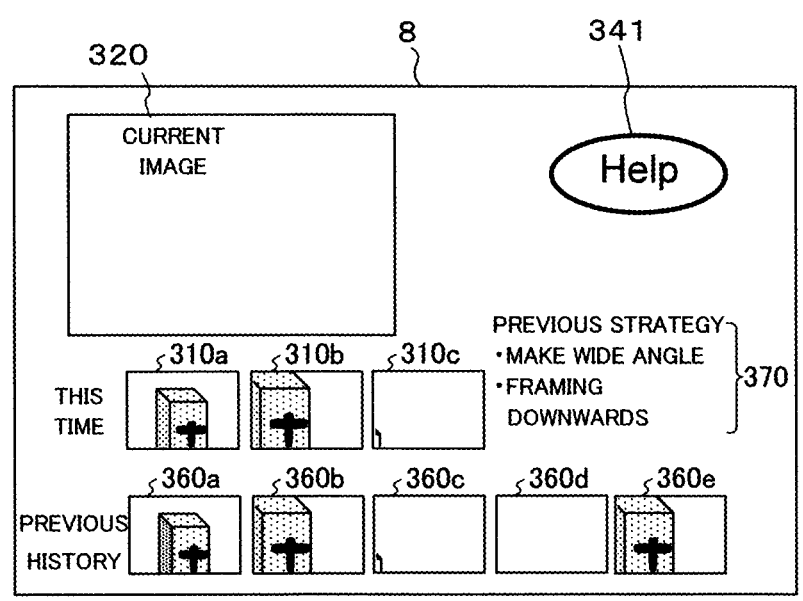
FIG. 18 is a drawing showing a second modified example display of guidance display, in the camera of one embodiment of the present invention.
Figure 19:
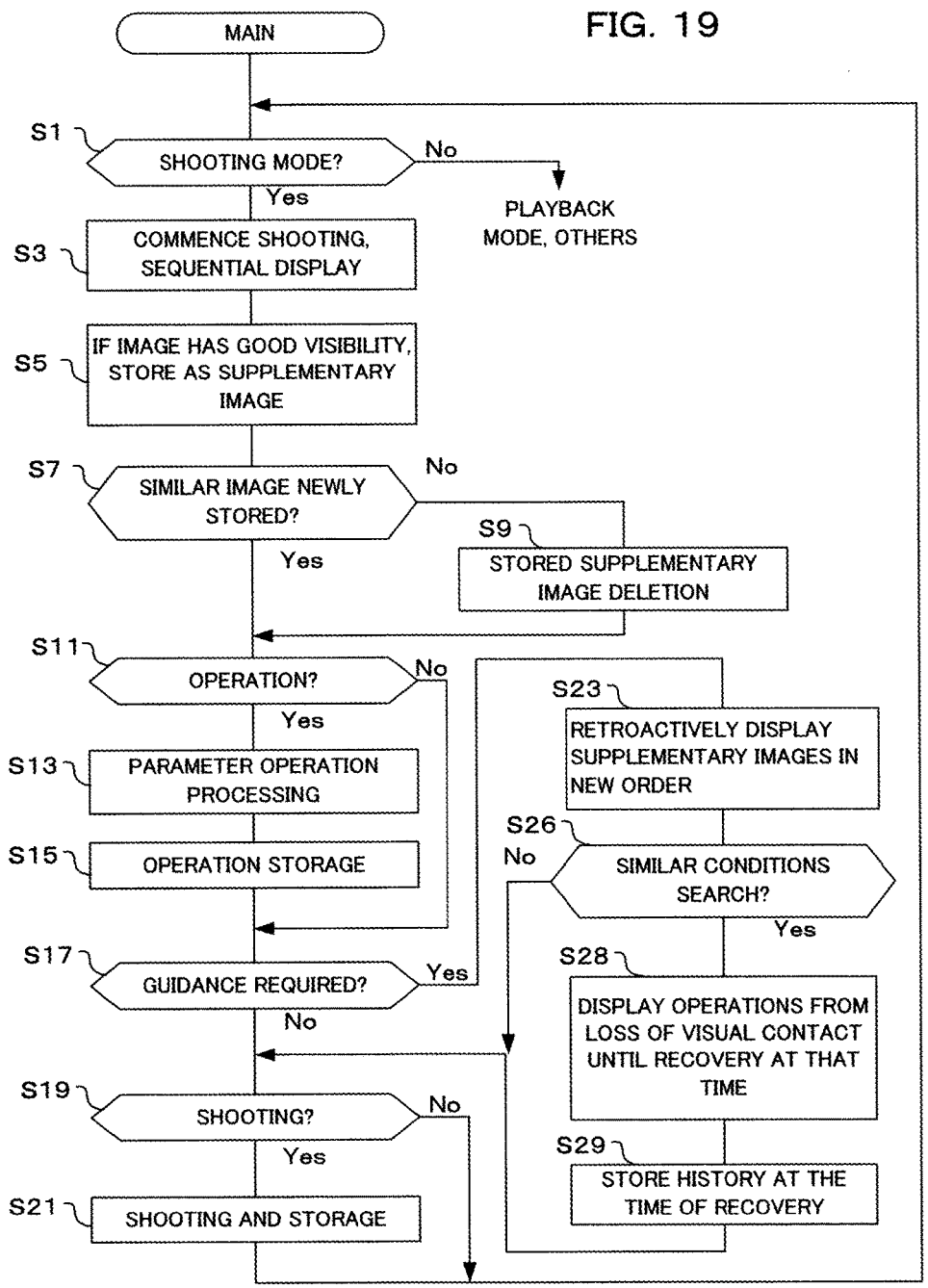
FIG. 19 is a flowchart showing main operation of the second modified example of guidance display, in the camera of one embodiment of the present invention.

FIG. 18 shows display of the display section 8 when it has been determined that guidance display is required, with this modified example. The current image 320 is displayed large on the screen of the display section 8, and supplementary images 310*a* to 310*c* are displayed below the current image 320.

A help display icon 341 is displayed to the side of the current image 320, and if the user touches this icon previous similar conditions are searched for in order to display a previous recovery strategy. Supplementary images 360*a* to 360*e* are supplementary images that were stored for previous similar conditions that were retrieved when the help display icon 341 was subjected to a touch operation. A recovery strategy display area 370 is an area for displaying recovery strategies that were retrieved when performing a touch operation on the help display icon 341 as text, specifically operations, actions, and processes up until the physical object was captured again.

With the example shown in FIG. 18, if the user performs a touch operation on the help display icon 341 in a state where the current image 320 and supplementary images 310*a* to 310*c* at this time are displayed, the control section 1 searches for a previous similar condition, and if a similar condition is found supplementary images 360*a* to 360*4* for that time are displayed, and further a recovery strategy for that time is simply displayed on the recovery strategy display area 370. With the example shown in FIG. 18, a previous recovery strategy in which a zoom was operated to the wide-angle side, and framing was carried out downwards and to the left, is displayed. Supplementary images 360*c* and 360*d* are for either a state where visual contact with the physical object was lost, a state where an image could not be detected, or a state where an image could not be found etc., while in supplementary image 360*e* the physical object has been captured again. The fact that the user can easily capture the physical object using operations in accordance with a previous recovery strategy is extremely convenient.

Next, the main operation of this modified example will be described using FIG. 19. Main operation of this modified example is the same as that of the one embodiment, except that the flowcharts of the main operation in FIG. 5 and FIG. 6 are replaced by the flowchart in FIG. 19, and in detail, parts of FIG. 6 are replaced with steps S23 to S29 in FIG. 19. Description will therefore concentrate on this point of difference.

If the flow for main operation of this modified example is started, in step S17 it is determined whether or not guidance is required, and if it is determined that guidance is required supplementary images are retroactively displayed in a new order (S23). Since guidance is necessary, the guidance section 1*d* carries out control for guidance display in step S23 and onwards. Here, as was shown in FIG. 18, supplementary images 310*c*, 310*b* and 310*a* are displayed on the display section 8. Supplementary images were stored in the memory 1*e* in step S5, and so these images are read out and retroactively displayed in the new order.

Next, it is determined whether or not similar conditions are searched for (S26). As was described previously if the user has lost sight of the physical object and wants to know of recovery strategies, a touch operation is performed on the help display icon 341. In this step, therefore, it is determined whether or not the help display icon 341 has been touched by the user. If the result of this determination is that there is not similar condition search, processing advances to step S19.

On the other hand, if the result of determination in step S26 is that there is similar condition search, operations from loss of visual contact until recovery was achieved, or operations in the case finding again was not possible, are displayed (S28). Here, current and previous conditions are searched from among supplementary images that were stored in step S5 (except for images that were deleted in S9) and/or from among operation storage that was stored in step S15, and if similar conditions are found supplementary images at that time are displayed (refer to supplementary images 360*a* to 360*e* in FIG. 18). It should be noted that for this similar condition search supplementary images that were stored in step S5 (except for images that were deleted in S9) and/or operation storage that was stored in step S15 remains stored, without being deleted, even after shooting and storage has been completed. This storage may be useful for documents and reports.

Also, in step S28 operations up until recapture of the physical object in the similar conditions that have been currently retrieved are formed into text based on history of the operation storage, and displayed on the recovery strategy display area 370. It should be noted that in a case where a recovery strategy is already stored, the stored recovery strategy is read out and displayed.

In step S28, if display of a recovery strategy is carried out, history at the time of recovery is stored (S29). Here, text data for the recovery strategy that was generated in step S28 is stored in the memory 1*e*. Once storage has been performed processing advances to step S19. This recovery storage is useful for documents and reports, and supplementary display may be carried out by analyzing image changes and control of devices in time series and referencing corresponding text. This means that it is also possible to make simple report writing such as "missed five minutes later" or "found by looking up two minutes later".

In this way, with this modified example, if the user loses sight of the physical object on the display section 8 and determines that guidance display is necessary (or it is automatically determined), display of supplementary images in addition to the current image is carried out. If the help display icon 341 is then operated, supplementary images 360*a* to 360*c* representing previous history are displayed, and a previous recovery strategy is displayed in the area 370. Specifically if guidance display is instructed by the instruction section, previous similar conditions are searched for, and guidance display is carried out based on the search results. As a result a recovery strategy from loss of visual contact with a physical object up until the physical object is captured again is known, and it is possible to easily recapture the physical object.

It should be noted that with this modified example display on the recovery strategy display area 370 has been in the form of text, but text display is not limiting, and other visual display methods may be used such as symbols and pictograms, and audio display may also be used. So, although three supplementary images and five supplementary images for previous history have been displayed, there may be different numbers of these images, and further the arrangement positions and displaying below the current image are not limiting. Also although a help operation is carried out using the help display icon 341, there may be other selection methods.

Next, an example where the present invention has been applied to an industrial endoscope will be described using FIG. 20A and FIG. 20B. FIG. 20A is a perspective drawing of the inside of a machine 500 when an industrial endoscope 400 has been inserted into the inside of the machine 500. When applying the present invention to the industrial endoscope 400, within the camera section 11 of the imaging device 1 shown in FIG. 2 the imaging section 2 and the attitude sensor 7b arranged at a tip end of the industrial endoscope 400, and remaining sections are arranged at the operator side end of the industrial endoscope 400. Besides this, special members such as, for example, operation members for bending the tip section, are suitably arranged in the industrial endoscope.

FIG. 20B shows display on the display section 8 when the industrial endoscope 400 has been inserted into the inside of the machine 500. Time T21 is the state that was shown in FIG. 20A, away from a wall surface 501 inside the machine 500. In this state the user can see the wall surface 501 and a platform section 503 inside the machine 500, and it is possible to gain an understanding of the overall figuration.

In FIG. 20B, if time T22 is reached the user inserts the industrial endoscope 400 to the wall surface 501 side, but approaches too close, and ascertaining the overall figuration of the inside of the machine 500 is difficult. If the control section 1 determines that ascertaining the overall figuration is difficult from image data (in S17 of FIG. 5, a state where it has automatically been determined that guidance is required), then as shown in FIG. 20B warning display of "overall figuration cannot be ascertained" is carried out.

If it has been determined that ascertaining the overall figuration is difficult and time T23 is reached, supplementary image 310d that was stored before it was determined that guidance was required is displayed as a sub image. If the supplementary image 310d in which the overall figuration is known has been displayed as a sub image, it becomes easy for the user to estimate current position and will understand what direction of rotation will return to the original position. Time T24 represents a display image in a case where the industrial endoscope 400 has been rotated.

In this way, the present invention can be applied to an industrial endoscope or a medical endoscope. As with an endoscope, it is easy to lose sight of a physical object in a case where the user is unable to perform operations while looking directly at a machine by inserting an endoscope into a machine or body. In this case, if it is possible to reference supplementary images and an operation history for before visual contact with the physical object was lost, as with the embodiments and modified examples described previously, it becomes possible to easily locate the physical object.

As has been described above, with the one embodiment and modified examples of the present invention, a physical object is photographed and image data is output (for example, S3 in FIG. 5), an operation history when taking the photograph is stored (for example, S5 in FIG. 5), and guidance relating to differences between a previous image and the current image is determined in accordance with previously acquired images and the stored operation history (S17 Yes in FIG. 5, and after). As a result, when a physical object that is being photographed or a physical object that is being observed is lost, an imaging section having a wide angle of view is not required in order to find the physical object. Specifically, since guidance is produced in accordance with information relating to differences between previously and currently, in accordance with operation history, it is possible to easily search for an object that is being observed before visual contact is lost.

Also, with the one embodiment and modified examples of the present invention, a physical object is photographed and image data is output (for example, S3 in FIG. 5), image data is stored as a supplementary image (for example, S5 in FIG. 5), guidance display for finding the physical object is instructed (for example, S17 Yes in FIG. 5), and when guidance display has been instructed supplementary images that were stored before visual contact with the physical object was lost are displayed on the display section (for example, FIG. 6, time T3 in FIG. 4, FIG. 15A, FIG. 15B and the supplementary images 310a to 310c in FIG. 16). As a result, when a physical object that is being photographed or a physical object that is being observed is lost, an imaging section having a wide angle of view is not required in order to find the physical object. Specifically, since supplementary images relating to differences between the past and currently are displayed, it is possible to easily search for an object that is being observed before visual contact is lost.

It should be noted that with the one embodiment and modified examples of the present invention, various examples of guidance display have been shown in FIG. 4, FIG. 15A, FIG. 15B, FIG. 16 and FIG. 18, but appropriate combinations of these may also be used. Specifically, numbers and arrangements of the supplementary image, as well as symbols such as arrows for guidance, and guidance display using text, may be used in combination and changed as appropriate.

Also, with the one embodiment of the present invention, the imaging control section 1a, image determination section 1b and guidance section 1d are described as respective sections inside the control section 1, but all or some of the sections may be implemented using software and executed by a CPU within the control section 1, and conversely they may be implemented as hardware. Also, the communication section 6 enables communication between the body section 12 and an external server or the like, and some of the functions of the control section 1, such as the guidance section 1d, may be executed by an external server, and display may be performed by receiving guidance display from this external server.

Further, with the one embodiment and modified examples of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC), tablet type computer, game console etc. Also, the present invention may be applied to a shooting device or imaging device that is linked with a robot that is capable of movement control or a drone (a small unmanned aircraft that is capable of unmanned flight by means of remote control or automatic control), or to a vehicle mounted unit.

Also, an imaging operation guidance device of the present invention comprises an image sensor for imaging a physical object and outputting image data, and memory for storing a history as change over time of operations relating to direction and position of the image sensor, and so is capable of providing various methods of assistance and guidance for directions and positions. That is, it is possible to exploit previous experience in accordance with comparison of previous operation history that has been stored in the memory and a most recent operation history. Further, by determining when it was possible to adeptly find a physical object, and when it was not, and storing as history information, a system that accumulates trial and error results for operation progress is constituted, and which can be enormously effective in combination with learning for artificial intelligence. That is, a controller for determining guidance relating to differences between previous images and currently is further provided with sensors for imaging conditions and the environment etc., and in a case such as where minute conditions are determined, by utilizing artificial intelligence higher performance and more effective guidance and assistance becomes possible. Obviously the guidance and assistance may be voice guidance and not only display, and devices that utilize voice assistance and vibration and motion may also be used. The embodiment of the present invention has been described centering on using visual contact as a result of change in position, direction or angle of view. However, this is not limiting, and loss of visual contact may also arise as a result of any of various causes such as bright exposure, dynamic range relationships, and position and focus, depth of field relationships and image processing suitability. As a result of such differences between operations and conditions, in the event that loss of visual contact arises it is possible to apply the present invention.

Also, the present invention is not limited to an imaging device, and may also be applied to various devices, for example a microscope or endoscope, and may also be utilized in an auxiliary role in cases such as where visual contact with a microscope sample is lost or can not be found when the sample is moved, replaced and compared, or when visual contact is lost or discovery is not possible when plugging in a surgical endoscope. In any event it is possible to apply the present invention to any device that is used to continuously observe or record a physical object.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging operation guidance device, comprising:
   an image sensor that obtains a current image;
   an attitude sensor that measures motion of the image sensor;
   a memory that stores at least one previous image and an operation history for the image sensor; and
   a controller that is communicatively coupled to the image sensor, the attitude sensor and the memory, wherein the controller:
   stores measurements from the attitude sensor in the memory,
   identifies an object of interest that is located in the at least one previous image that is missing from the current image, and
   determines guidance instructions for obtaining a future image based on the operation history and the measurements from the attitude sensor, wherein the guidance instructions are determined to restore the object of interest to the future image.

2. The imaging operation guidance device of claim 1, wherein
   the operation history comprises operation information relating to an optical zoom.

3. The imaging operation guidance device of claim 1, further comprising
   a display communicatively coupled to the controller that displays at least one of the at least one previous image and the current image.

4. The imaging operation guidance device of claim 3, wherein
   the controller further causes the display to display the guidance instructions.

5. The imaging operation guidance device of claim 3, wherein:
   the memory further stores guidance instruction from a prior time period; and
   the controller further determines the guidance instructions based on the guidance instruction from the prior time period.

6. The imaging operation guidance device of claim 1, wherein
   the operation history comprises at least one of distance information, orientation information, focal length information, optical axis direction information, depth direction information, and exposure information.

7. The imaging operation guidance device of claim 1, wherein the controller further:
   generates an image file that stores at least one of: the at least one previous image, symbols representing the guidance instructions, and text representing the guidance instructions.

8. The imaging operation guidance device of claim 7, wherein
   the image file is displayed on a display.

9. The imaging operation guidance device of claim 1, wherein:
   the guidance instructions include a sequence of manual operations to be performed in order to find the object of interest, and
   the controller further determines that the sequence of manual operations has been performed based on the operation history and the measurements from the attitude sensor.

10. The imaging operation guidance device of claim 9, further comprising
    a display communicatively coupled to the controller that displays the sequence of manual operations.

11. The imaging operation guidance device of claim 1, wherein
    the memory stores at least one of operation information causing change in angle of view for imaging by the image sensor, operation information for causing change in direction of the image sensor in lateral and vertical directions, information causing change in brightness of the image sensor, and information causing change in focus of an image formed on the image sensor.

12. An imaging operation guidance system, comprising:
an imaging device comprising a lens and an image sensor, the imaging device obtains a plurality of images, acquires image data relating to the plurality of images, and outputs the image data;
an attitude sensor that measures motion of the imaging device;
a memory that stores at least one previous image; and
a processor communicatively coupled to the imaging device, wherein the processor:
obtains a current image from the imaging device,
stores an operation history for the imaging device and measurements from the attitude sensor in the memory,
identifies that an object of interest that is located in the at least one previous image is missing from the current image, and
determines guidance instructions for a future image based on the operation history and the measurements from the attitude sensor, wherein the guidance instructions are determined to restore the object of interest to the future image.

13. An imaging operation guidance method, comprising:
obtaining a current image from an imaging device;
receiving measurements from an attitude sensor that measures motion of the imaging device;
storing operation history for the imaging device and the measurements from the attitude sensor in a memory;
identifying that an object of interest located in the at least one previous image stored in the memory is missing from the current image; and
determining guidance instructions for a future image, based on the operation history and the measurements from the attitude sensor, wherein the guidance instructions are determined to restore the object of interest to the future image.

14. An imaging operation guidance device, comprising:
a display;
an image sensor that obtains a previous image and a current image;
an attitude sensor that measures motion of the image sensor;
an image data memory that stores at least one previous image and a supplementary image; and
a controller communicatively coupled to the display, the image sensor, the image data memory and the attitude sensor, wherein the controller:
determines that an object of interest is visible in the previous image,
on a condition that the object of interest is visible, stores the previous image as the supplementary image,
stores measurements from the attitude sensor in the memory,
identifies that the object of interest located in the at least one previous image is missing from the current image, and
on a condition the object of interest is identified as missing, displays the supplementary image on the display and determines guidance instructions for a future image based on the measurements from the attitude sensor, wherein the guidance instructions are determined to restore the object of interest to the future image.

15. The imaging operation guidance device of claim 14, wherein
the controller further causes the display to display both the current image and the supplementary image.

16. The imaging operation guidance device of claim 14, wherein:
the controller further stores operation history for the image sensor in the memory when the supplementary image is stored.

17. The imaging operation guidance device of claim 16, wherein:
the memory further stores operation history for the image sensor over a plurality of time frames, and
the controller further determines the guidance instructions by searching the operation history for the image sensor over the plurality of time frames.

18. An imaging operation guidance method, comprising:
obtaining a previous image and a current image from an imaging device;
determining that an object of interest is visible in the previous image;
determining that the object of interest is visible, and storing the previous image as a supplementary image when the object of interest is determined to be visible;
storing measurements from an attitude sensor that measures motion of the imaging device;
identifying that the object of interest located in the at least one previous image is missing from the current image; and
displaying the supplemental image on the display and determining guidance instructions for a future image based on the measurements from the attitude sensor when the object of interest is identified as missing from the current image, wherein the guidance instructions are determined to restore the object of interest to the future image.

* * * * *